United States Patent
Walker et al.

(10) Patent No.: US 6,443,843 B1
(45) Date of Patent: Sep. 3, 2002

(54) SYSTEM TO PROVIDE GAME PLAY FOR PRODUCTS

(75) Inventors: Jay S. Walker, Ridgefield, CT (US); Andrew P. Golden, New York, NY (US); Magdalena Mik, Greenwich, CT (US); Timothy A. Palmer, Stamford, CT (US); Nandu A. Talwalkar, New Canaan, CT (US); Keith Bemer, New York, NY (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/606,566

(22) Filed: Jun. 29, 2000

Related U.S. Application Data
(60) Provisional application No. 60/204,673, filed on May 17, 2000.

(51) Int. Cl.[7] ............................................. G06F 19/00
(52) U.S. Cl. ............................. 463/42; 705/16; 705/26
(58) Field of Search ........................... 273/138.1, 138.2, 273/459, 460–461; 463/1, 16–22, 25–27, 40–43, 47, 30, 36–39; 705/14, 16, 21, 26–27; 395/762, 774, 155, 214, 216; 364/412, 405

(56) References Cited

U.S. PATENT DOCUMENTS
4,869,500 A  * 9/1989 Williams ..................... 273/1 E
4,982,346 A  * 1/1991 Girouard et al. ............ 364/550

(List continued on next page.)

OTHER PUBLICATIONS

"Direct Mail Finds New Level of Sophistication; Adopting High–Tech Methods Builds Store Image, Traffic Increases; Includes Related Article on ADVO System's Marriage Mail Service", Dec. 1986, Chain Store Age Executive with Shopping Center Age, vol. 62, ISSN: 0193–1199 at pg. 25.

Stevens, Larry, "Despite a Tough Economy, Retailers and Others Continue to Test (and Buy) New Technology to Keep Old and New Buyers Happy", Mar. 2, 1992, DialogWeb Output, Customer Contact Section.

Sloane, Wendy "Gambling: The New Game in Moscow, Legal or Not" Jul. 22, 1991; The Associated Press.

"County Attorney's Ruling Opens Doors for Phone Card Machines" Aug. 6, 1996; To Business desks; Southwest Newswire.

"Slimmer Compuservr Hong Kong Chases Corporate Accounts" Jun. 20, 1997; Newsbytes.

Elson, Joel "Checkout Prizes Key Meijer Toy Event" Dec. 1, 1997; No. 48, vol. 47; p. 44; ISSN: 0039–5803; Supermarket News.

(List continued on next page.)

Primary Examiner—Joe H Cheng
Assistant Examiner—Scott E. Jones
(74) Attorney, Agent, or Firm—Steven M. Santisi

(57) ABSTRACT

A method for providing a product is described in which a selection of a product is received from a customer, a fee to play a game is received, an outcome of the game is determined, the product is provided to the customer if the outcome is a winning outcome, and a portion of the fee is credited to the customer if the outcome is a losing outcome.

94 Claims, 12 Drawing Sheets

U.S. PATENT DOCUMENTS

| | | | |
|---|---|---|---|
| 5,057,915 A | * 10/1991 | Von Kohorn | 358/84 |
| 5,085,435 A | 2/1992 | Rossides | 273/138 A |
| 5,216,595 A | * 6/1993 | Protheroe | 364/412 |
| 5,269,521 A | 12/1993 | Rossides | 273/138 R |
| 5,269,522 A | * 12/1993 | Chagoll et al. | 273/138 A |
| 5,362,051 A | * 11/1994 | Swafford, Jr. et al. | 273/138 A |
| 5,368,129 A | 11/1994 | Von Kohorn | 186/52 |
| 5,373,440 A | * 12/1994 | Cohen et al. | 364/410 |
| 5,551,692 A | 9/1996 | Pettit et al. | 273/143 R |
| 5,620,182 A | 4/1997 | Rossides | 273/138.2 |
| 5,668,591 A | * 9/1997 | Shintani | 348/12 |
| 5,722,890 A | * 3/1998 | Libby et al. | 463/17 |
| 5,791,991 A | 8/1998 | Small | 463/41 |
| 5,816,918 A | 10/1998 | Kelly et al. | 463/16 |
| 5,848,399 A | * 12/1998 | Burke | 705/27 |
| 5,848,935 A | * 12/1998 | Noell et al. | 463/16 |
| 5,851,149 A | * 12/1998 | Xidos et al. | 463/42 |
| 5,855,514 A | * 1/1999 | Kamille | 463/17 |
| 5,857,175 A | 1/1999 | Day et al. | 705/14 |
| 5,882,258 A | * 3/1999 | Kelly et al. | 463/11 |
| 5,928,082 A | * 7/1999 | Clapper, Jr. | 463/16 |
| 5,941,772 A | 8/1999 | Paige | 463/20 |
| 6,003,013 A | * 12/1999 | Boushy et al. | 705/10 |
| 6,012,984 A | * 1/2000 | Roseman | 463/42 |
| 6,015,344 A | 1/2000 | Kelly et al. | 463/16 |
| 6,017,032 A | 1/2000 | Grippo et al. | 273/138.1 |
| 6,041,308 A | * 3/2000 | Walker et al. | 705/14 |
| 6,048,268 A | * 4/2000 | Humble | 463/17 |
| 6,089,981 A | * 7/2000 | Brenner et al. | 463/40 |
| 6,141,006 A | * 10/2000 | Knowlton et al. | 345/335 |
| 6,165,070 A | * 12/2000 | Nolte et al. | 463/20 |
| 6,173,267 B1 | * 1/2001 | Cairns | 705/14 |

OTHER PUBLICATIONS

"Betting Inc. and eBET.COM Announce Merger to Pursue Estimated $ 200 Billion Global Home and Office Self–Serviced Electronic Wagering Industry" Jan. 6, 1999; Business Editors and Gaming Writers; Business Wire.

Sweeney, James P. "State Loses Round in Suit on Video Slots; Argument on Phone Card Dispenser Rejected" Apr. 8, 1999; News,p. A–3; View Related Topics.

"Catalina Marketing Solidifies In–Store Capabilities Through Acquisition of Compuscan; Acquisition Provides Catalina Marketing with Patented Technology for Instant–Win Promotions" Apr. 30, 1999; Financial News; PR Newswire.

Dennis, Sylvia "Autoweb Signs Major Deal with Citibank" Sep. 23, 1999; Newsbytes.

Bronstad, Amanda "BGI to Back Web Deal with $ 2.5 Million Offering" Oct. 15, 1999; vol. 19; No. 33; p. 8; Business Dateline; Austin Business Journal.

MacDonald, John "Judge Rules Phone Cards are Illegal Gambling" Mar. 3, 2000; p. 6C; The Bismarck Tribune.

Boey, Stephen "Being First no Guarantee of Success: Wang" Apr. 14, 2000; Business IT; p. 18; Business Times (Malaysia) (Malaysia).

"The Wheel of Food" download date, Feb. 19, 2000; dside America Tours, http://www.roadsideamerica.com.

"Play Win While Shopping" download date, Apr. 19, 2000; Free Gift Surey; http://www.winwhileshopping.com/contestpage.htm.

"Win Valuable Prizes at Prizepoint" download date, Apr. 19, 2000; PrizePoint Entertainment; http://www.prizepoint.com.

"Learn More" download date, Apr. 19, 2000; PrizePoint Entertainment; http://www.prizepoint.com.

"In–Store Instant–Win Games" download date, May 8, 2000; http://www.catmktg.com.

* cited by examiner

| PRODUCT IDENTIFIER 610 | MANUFACTURER 620 | MODEL NUMBER 630 | DESCRIPTION 640 | RETAIL PRICE 650 |
|---|---|---|---|---|
| P0001 | SONY | KV27S42 | 27 INCH COLOR TELEVISION | 450.00 |
| P0002 | PANASONIC | CT-27G24 | 27 INCH COLOR TELEVISION | 449.99 |
| P0003 | VOLVO | S80 | 4 DOOR SEDAN | 40,500.00 |
| P0004 | CAMPBELL'S | | TOMATO SOUP | 2.09 |

| CUSTOMER IDENTIFIER: C2532 | | 710 |
|---|---|---|
| PRODUCT IDENTIFIER 610 | OUTCOME 620 | FEE PAID 630 |
| P0001 | WIN | $4.50 |
| P0002 | LOSE | $400.00 |
| P0003 | WIN | $0.02 |

FIG. 7

SYSTEM TO PROVIDE GAME PLAY FOR PRODUCTS

CROSS-REFERENCE TO RELATED APPLICATION

This application claims the benefit of provisional U.S. Application Ser. No. 60/204,673, filed May 17, 2000, for "SHOPPING AS GAMBLING", the contents of which are incorporated by reference herein for all purposes.

BACKGROUND OF THE INVENTION

1. Field Of The Invention

The present invention relates to systems for providing products to customers. More specifically, the present invention concerns a system to provide a product to a customer in accordance with a game outcome.

2. Description Of The Related Art

Retailers experiment with many types of systems designed to attract customers away from other retailers. Some of these systems attempt to attract customers by injecting excitement into a retail shopping experience.

Sweepstakes are one such system. A retailer conducts a sweepstakes by receiving entries from customers at a retail store, by selecting one or more entries from the received entries and by awarding predetermined prizes to customers from whom the selected entries were received. Accordingly, a sweepstakes is intended to motivate a customer to visit the retail store by presenting a possibility of winning a prize. However, the ability of a sweepstakes to influence a customer's choice of retail stores is limited because the predetermined prizes are often products in which the customer has little particular interest and because a probability of winning a desirable prize in a sweepstakes open to the public is often perceived to be extremely low. As a result, retailers often conclude that the limited ability of a sweepstakes to attract customers is outweighed by a cost of the awarded prizes.

Other retail systems which attempt to provide excitement, such as that described in U.S. Pat. No. 5,269,521 to Rossides, allow customers to gamble for products. According to U.S. Pat. No. 5,269,521, a customer purchasing a product submits an additional payment to participate in a game of chance in which a winning outcome results in an award of an associated product to the customer and a losing outcome results in a loss of the payment. However, customers in a shopping environment are usually unwilling to risk losing the payment without receiving any benefit in return. Accordingly, gambling-based systems are limited in their attractiveness to retail customers. Moreover, these systems invoke gambling laws and regulations which present financial and administrative burdens that complicate a retailer's business to an extent outweighing any additional revenues resulting from the systems.

Therefore, what is needed is a system for injecting excitement into a shopping experience which is more attractive to customers than conventional systems, and which is also more profitable and less cumbersome to retailers.

SUMMARY OF THE INVENTION

The present invention addresses the foregoing needs by providing, in one aspect, a system to provide a product which includes reception of a selection of a product from a customer, reception of a fee to play a game, determination of an outcome of the game, provision of the product to the customer if the outcome is a winning outcome, and credit of a portion of the fee to the customer if the outcome is a losing outcome. Such a system is believed to be attractive to a customer because the customer chooses a product for which to play a game, and because a portion of a received fee is credited to the customer if an outcome of the game is a losing outcome. As a result, the customer is able to play for products actually desired and a risk of loss is less than that presented by gambling-based systems. Furthermore, a retailer may control the fee amount and the game outcomes in order to offset any losses resulting from winning outcomes with increased volume and revenue.

In one embodiment of the foregoing aspect, the customer is credited the entire received fee if the outcome is a losing outcome. Such an embodiment increases the attractiveness of the inventive system to customers because a participating customer will either win the product or be no worse off than if the game was not played. Accordingly, a retailer may be willing to practice this embodiment in return for increased customer traffic and customer loyalty.

In other embodiments, the fee is credited to a sale price of the selected product if the outcome is a losing outcome. Again, assuming that the customer intends to buy the product regardless of the game outcome, the customer experiences no loss as a result of playing the game, even if a resulting outcome is a losing outcome. However, in a case that the customer does not purchase the product after playing the game, the retailer earns the fee as an additional revenue source.

In an additional aspect, the selection of the product includes a commitment from the customer to purchase the product. According to this aspect, a retailer will receive a retail profit margin for the sale of the product if the outcome is a losing outcome. As a result, a retailer may be more willing to provide a greater probability of winning outcomes than in an embodiment where the customer does not commit to purchase the product.

In yet another aspect, the game reflects a probability that a winning outcome will result therefrom, which is a first probability if a product selection was received from a first customer and is a second probability if the product selection was received from a second customer. By virtue of these features, provision of products to customers may be tailored so that, for example, loyal customers (e.g. customers registered with a retailer's frequent shopper program) are more likely to receive winning outcomes than new customers.

The invention also concerns a system in which a sale price of a product is received from a customer, the product is provided to the customer in exchange for the sale price, an outcome of a game is determined, and a portion of the sale price is credited to the customer if the outcome is a winning outcome. This aspect of the invention encourages customers to purchase products in the hope of receiving a credit for a portion of the purchase price. Moreover, a retailer will likely be willing to allow occasional winning outcomes in exchange for increased customer flow resulting from the invention.

In another aspect, the invention includes means for obtaining a selection of a product from a customer, means for obtaining a fee to play a game, means for deciding an outcome of the game, means for transmitting the product to the customer if the outcome is a winning outcome, and means for providing the fee to the customer if the outcome is a losing outcome.

With these and other advantages and features of the invention that will become hereinafter apparent, the nature of the invention may be more clearly understood by reference to the following detailed description, the appended claims, and to the several drawings attached hereto.

BRIEF DESCRIPTION OF THE DRAWINGS

FIG. 6 illustrates a tabular representation of a portion of a product database according to one embodiment of the present invention;

FIG. 7 illustrates a tabular representation of a portion of an outcome database according to one embodiment of the present invention;

DETAILED DESCRIPTION

Figure 1A:
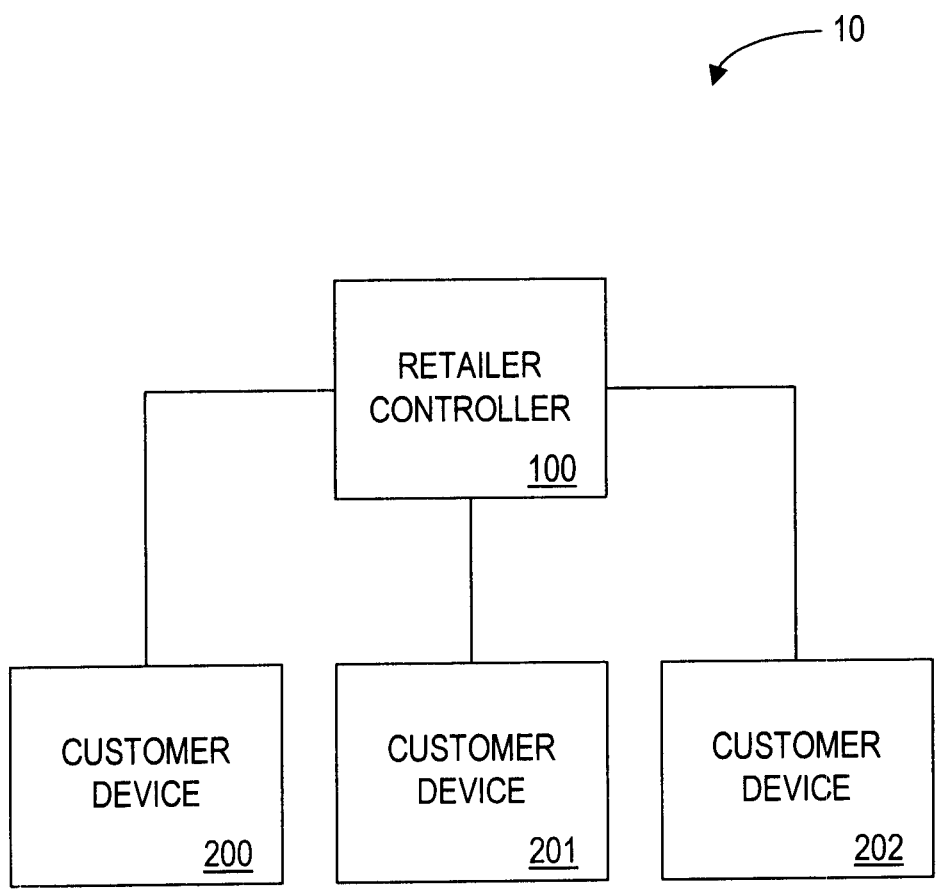
FIG. 1A is a block diagram of a system according to one embodiment of the present invention.

To insure clarity of the following description, set forth below are definitions of several terms used herein. The scope of the present invention is not to be deemed limited by the definitions.

Product: A good and/or a service. The term product may also be used herein to refer to one or more related or unrelated goods and/or services.

Retailer: An entity which sells products to customers. Such entities include proprietors of traditional retail stores, proprietors of online retail stores, product manufacturers, product warehousers, and online storefront providers.

Retail Price: A price for which a product is sold to customers absent a price discount.

Retail Store: Generally, a location at which products are offered for sale by a retailer. Traditionally, a retail store is a physical building in which a retailer offers and sells products to customers. Retail stores also include websites in which descriptions and visual representations of products for sale may be viewed by customers and through which the customers may purchase one or more of the products for sale.

Sale Price: A price which a customer pays in exchange for a product. Sale prices include retail prices and prices reflecting a price discount.

As a brief introduction to the following detailed description, one specific embodiment of the present invention is now described. According to this embodiment, a customer executes a web browser on a personal computer and enters into the web browser a uniform resource locator (URL) corresponding to a website operated by a retailer. The URL is sent via the World Wide Web to an appropriate web server located in a retailer controller and, in response, the web server delivers a web page to the web browser, which displays the web page on the personal computer. The customer then navigates through various web pages of the website using the web browser in order to shop for products.

The customer selects a product by selecting a displayed hyperlink corresponding to the product. In response, the web server transmits a web page to the Web browser including a view, a description and a price of the product. The web page also includes a hyperlink selectable to indicate that the customer desires to play a game for the product. Once this hyperlink is selected, the web server determines a fee required to play the game based on a retail price of the product and on a probability that the game will result in a winning outcome. For example, if the product has a retail price of $10 and the probability of a winning outcome is 0.1 (i.e. 1 in 10 plays results in a winning outcome), the fee is determined to be $1. The fee is charged to the customer using a payment identifier previously provided by the customer.

The game, such as a slot machine game, is then executed and the outcome of the game is determined. If the outcome is a winning outcome, the product is shipped to the customer without charging the customer any additional fee for the product, except perhaps a shipping and handling fee. If the outcome is a losing outcome, a web page is transmitted to the customer informing the customer that she did not win the product but that she possesses a credit equal to the $1 fee which is applicable towards the purchase of the product. Accordingly, the customer may purchase the product for $1 less than the retail price of the product.

It should be noted that the foregoing merely describes one particular embodiment of the invention, and that the invention should not be deemed limited to the particular aspects mentioned above.

System

FIG. 1A shows a block diagram of a system 10 according to embodiments of the present invention. As shown, the system 10 includes a retailer controller 100 in communication with customer devices 200, 201 and 202. The retailer controller 100 may comprise one or more computer servers providing, for example, a database server and a World Wide Web server. In one embodiment, the World Wide Web server operates to receive requests for web pages from the customer devices 200, 201 and 202, to create web pages, and to transmit the web pages to the customer devices 200, 201 and 202.

Each of the elements of the system 10 may be located in a retail store. For example, the retailer controller 100 may be a computer server located in a control center within the retail store, and the customer devices 200, 201 and 202 may be customer kiosks situated at various locations within the retail store. However, the elements of the system 10 need not be located at a retail store or in a same location. Rather, the system 10 may be used in an online embodiment wherein at least one of the customer devices 200, 201 and 202 is located remotely from the retailer controller 100. It should be noted that the system 10 may simultaneously provide remote and in-store functionality.

Multiple physical devices may be used to perform the functions of the retailer controller 100 according to the present invention, and some or all of these functions may also be performed manually. The retailer controller 100 may be operated by a retailer, by an entity providing customer acquisitions services to retailer, by an entity providing shopping and retail services to customers, by an entity providing online storefronts to retailers or by any other entity to which the present invention may provide benefits. In the following description, actions which may be performed by an entity operating the retailer controller 100, such as reception of a fee, provision of a product, and crediting a fee, will be imputed to the retailer controller 100.

As described above, at least one of the customer devices 200, 201 and 202 may be a dedicated kiosk operated within a retail store to communicate with the retailer controller 100, which may or may not be located in the retail store. One or more of the customer devices 200, 201 and 202 may also comprise a personal computer operated by a customer to access and interact with a website provided by a Web server executing within the retailer controller 100. Other types of customer devices 200, 201 and 202 usable in conjunction with the present invention include a personal digital assistant (PDA), an Internet kiosk, a product code scanner, a pager, a cellular phone, a shopping cart equipped with a communication terminal, a pay phone, a video game, an automated teller machine, a slot machine, a watch, a vending machine, an in-car communications system for providing World Wide Web data or the like, or any other device adapted to communicate with the retailer controller 100 over whatever communication media exist between the device and the controller 100. For example, in a case that the customer device 200 is a PDA which communicates with the retailer controller 100 over the World Wide Web locally or remotely, the customer device 200 may execute a web browser application for passing data to the retailer controller 100 and/or requesting data from the retailer controller 100.

In another example, the customer device 200 comprises both a retailer terminal (not shown) located at a retail store and a device such as a PDA used to communicate with the retailer terminal via an infrared or other connection. Such a retailer terminal may be associated with a single product or a group of products. This association allows the retailer controller 100 to identify a product or group of products relating to a received communication by reference to the retailer terminal from which the communication was received.

Figure 1B:
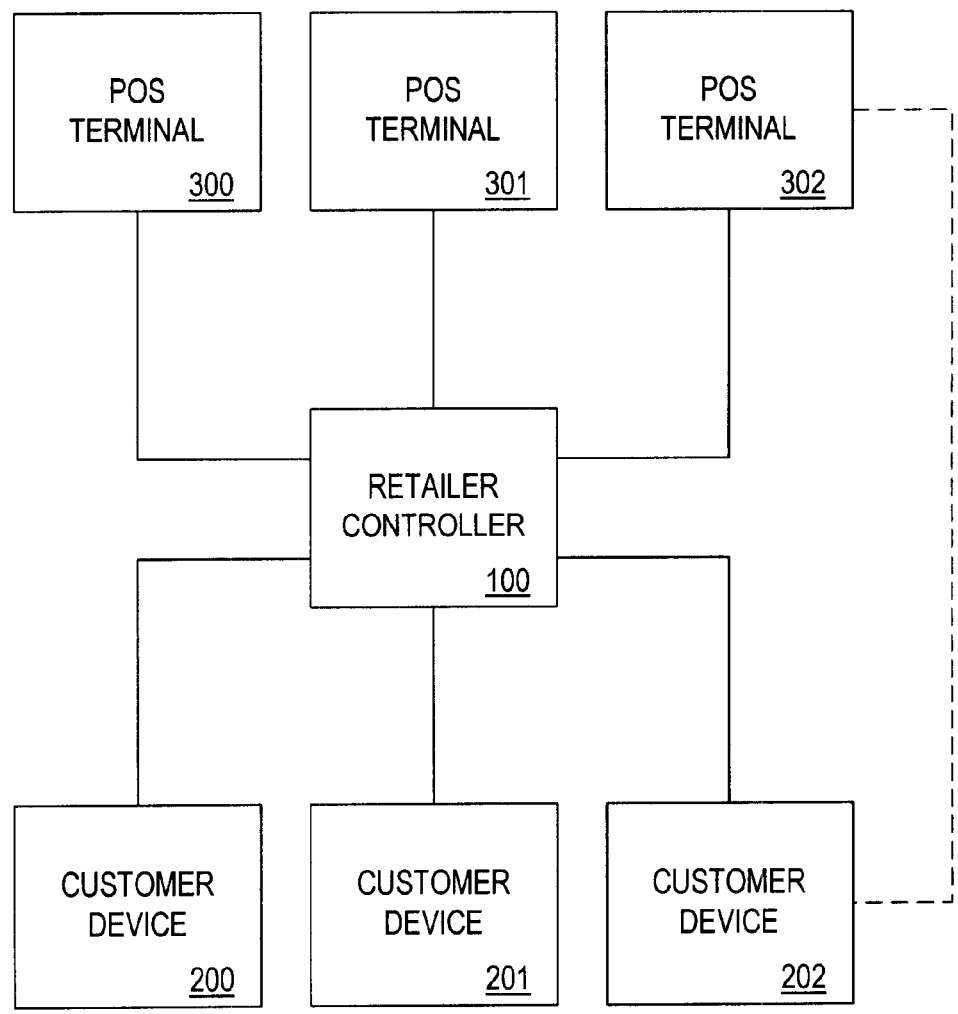
FIG. 1B is a block diagram of a system according to another embodiment of the present invention.

FIG. 1B illustrates a block diagram of a system 20 according to other embodiments of the present invention. The system 20 includes a retailer controller in communication with the customer devices 200, 201 and 202 as described with respect to the system 10. However, the system 20 also includes POS terminals 300, 301 and 302 in communication with the retailer controller 100. The system 20 may be used to embody the invention within a retail store. For example, the retailer controller 100 may be a computer server located in a control center within the retail store, the customer devices 200, 201 and 202 may be customer kiosks situated at various locations within the retail store, and the POS terminals 300, 301 and 302 may be cash registers located at a "checkout" area in the store. Of course, it is not required that any of the elements of the system 20 actually be located in a retail store.

One or more of the POS terminals 300, 301 and 302 may comprise an electronic cash register, computer terminal, or other type of POS terminal. In one embodiment, each of the POS terminals 300, 301 and 302 is located at a single retail store and is used to provide products to a customer by determining prices for products brought to the terminal and by charging the customer for each of the products. The POS terminals 300, 301 and 302 may also comprise dedicated terminals used solely in conjunction with the retailer controller 100 to provide products according to the present invention, or credit/debit card authorization terminals provided with software enabling operation in accordance with the present invention. In other embodiments, the retailer controller 100 controls the provision of products according to game outcomes for several retailers, and each of the POS terminals 300, 301 and 302 is located at a different retail store along with one of the customer devices 200, 201 and 202.

A customer device may communicate directly with a POS terminal, as shown with respect to the customer device 202 and the POS terminal 302. Such communication may occur using any communication media or protocol, and facilitates embodiments in which information required for customer checkout is stored in the customer device 202.

Although three customer devices are shown in FIG. 1A and FIG. 1B and three POS terminals are also shown in FIG. 1B, any number of customer devices and POS terminals may be in communication with the retailer controller 100 according to either embodiment of the invention. Furthermore, although the communication media between the customer devices 200, 201 and 202, the POS terminals 300, 301 and 302 and the retailer controller 100 are represented by dedicated connections, it should be understood that one or more of the customer devices 200, 201 and 202 and, in the case of the system 20, of the POS terminals 300, 301 and 302, may be connected to a network, such as a Local Area Network (LAN) or a Wide Area Network (WAN), to which is also connected the retailer controller 100. The network may be an Internet Protocol (IP)-based network, such as the World Wide Web, and/or one or more of a satellite-based network, a cellular network, a radio frequency (RF) network, a telephone network, a cable television network, or any other communication system for transferring data between locations.

It should also be understood that the invention may be embodied in hardware configurations other than those shown in FIG. 1A and FIG. 1B. For example, the invention may be embodied entirely in a customer device provided to customers by a retailer upon entry into a retail store. In other embodiments, product selections and fees are received and game outcomes are determined by a customer device or a POS terminal, and the POS terminal is used to provide a product or credit a portion of a fee to a customer based on the game outcomes.

Those skilled in the art will understand that devices in communication with each other need not be continually transmitting to each other. On the contrary, such devices need only to transmit to each other as necessary, and may actually refrain from exchanging data most of the time. For example, a device in communication with another device over the World Wide Web may not transmit data to the other for weeks at a time.

Devices

Retailer Controller

Figure 2:
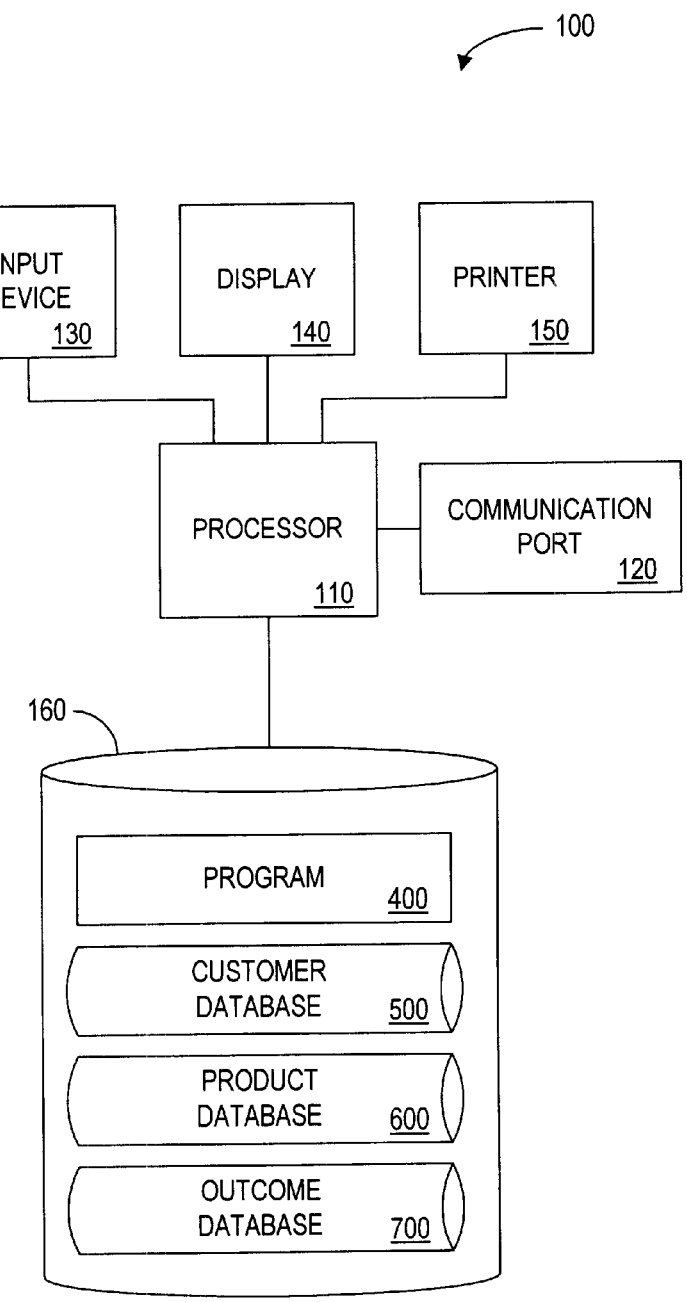
FIG. 2 is a block diagram of a retailer controller according to one embodiment of the present invention.

FIG. 2 illustrates an embodiment of the retailer controller 100. The retailer controller 100 may be implemented using a network server, a dedicated hardware circuit, an appropriately-programmed general purpose computer, or any other electronic, mechanical or electro-mechanical device.

The retailer controller 100 of FIG. 2 comprises a processor 110, such as one or more RISC® processors. The processor 110 is coupled to a communication port 120 through which the retailer controller 100 communicates with other devices. For example, the retailer controller 100 may receive a selection of a product from the customer device 200 and transmit a game outcome to the customer device 200 through the communication port 120. As mentioned above, each of the customer devices 200, 201 and 202, as well as the POS terminals 300, 301 and 302, may communicate with the retailer controller 100 over different communication media. Accordingly, the communication port 120 is configured, in one embodiment, to communicate using hardware and software protocols of the different media. In addition, the retailer controller 100 can communicate with locally-attached devices through the communication port 120.

Also connected to the processor 110 are an input device 130, a display 140 and a printer 150. The input device 130 may be any device for inputting data, such as a keyboard, a touch screen, a mouse, a voice input device, an infrared port, or the like. The input device 130 can be used by personnel to enter data used by the retailer controller 100 in accordance with the present invention, and can be used by an employee or a customer to input a selection of a product to the retailer controller 100.

The display 140 is used to output graphics and text and may be a CRT computer monitor, a flat panel display or another type of display device. Graphics, text or other data may also be output by the printer 150 in hardcopy format.

The processor 110 is also in communication with a data storage device 160. The data storage device 160 is generally a data memory and may include any appropriate combination of magnetic, optical and/or semiconductor memory. The data storage device 160 may also include, for example, Random Access Memory (RAM), Read Only Memory (ROM), a compact disc and/or a hard disk. Furthermore, the processor 110 and the storage device 160 may each be, for example: (i) located entirely within a single computer or other computing device; or (ii) connected to each other by remote communication media such as a serial port cable, telephone line or radio frequency transceiver. In one embodiment, the retailer controller 100 comprises one or more computers that are connected to a remote server computer for maintaining databases.

The data storage device 160 stores a program 400 of processor-executable process steps. The processor 110 executes the process steps of the program 400 and thereby operates in accordance with the present invention, and particularly in accordance with the steps described herein with respect to the retailer controller 100. In one example, the process steps of the program 400 are executed to receive a selection of a product from a customer, receive a fee to play a game, determine an outcome of the game, provide the product to the customer if the outcome is a winning outcome, and credit a portion of the fee to the customer if the outcome is a losing outcome.

According to one embodiment of the present invention, the steps of the program 400 are transferred from the data storage device 160 into a main memory, such as a RAM, and executed therefrom by the processor 110. In alternate embodiments, hard-wired circuitry may be used in place of, or in combination with, processor-executable software process steps for implementation of the processes of the present invention. Thus, embodiments of the present invention are not limited to any specific combination of hardware or software.

The program 400 may be stored in a compressed, uncompiled and/or encrypted format. The program 400 can be stored in the storage device 160 during manufacture of the storage device 160, can be downloaded from a compact disc or other computer-readable medium, or can be retrieved from a remote or local source through the communication port 120 in the form of a signal having the program 400 encoded thereon.

The data storage device 160 also stores processor-executable process steps for basic operation of the retailer controller 100, such as process steps of an operating system, a web server, a database management system and "device drivers" for allowing the retailer controller 100 to interface with computer peripheral devices. These latter process steps are known to those skilled in the art, and are therefore not described in detail herein.

The storage device 160 also stores i) a customer database 500, ii) a product database 600, and iii) an outcome database 700. The databases 500 to 700 are described in detail below and portions thereof are depicted in tabular form with sample entries in the accompanying figures. In this regard, and as will be understood by those skilled in the art, the schematic illustrations and accompanying descriptions of the databases presented herein are merely intended to demonstrate operable systems for associating and storing information which may be used in accordance with the present invention. A number of other data structures may be employed besides those suggested by the tables shown. Similarly, the illustrated entries of the databases represent sample information only; those skilled in the art will understand that the number and content of the entries can be different from those illustrated.

Customer Device

Figure 3:
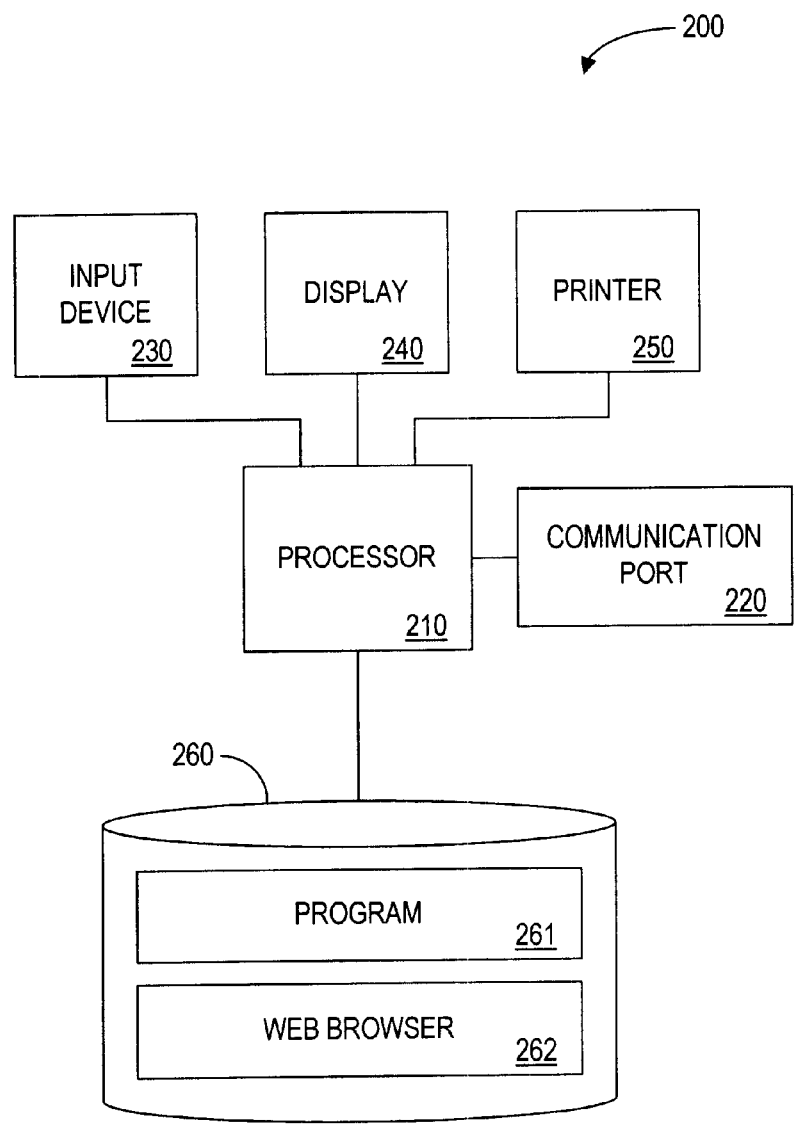
FIG. 3 is a block diagram of a customer device according to one embodiment of the present invention.

FIG. 3 illustrates several elements of the customer device 200. The customer device 200 is used in one embodiment to input data to and to receive data from the retailer controller 100, and to present data to a customer. For example, a customer may use the customer device 200 to select a product, pay a fee to play a game, receive the product if an outcome of the game is a winning outcome, and receive a portion of the fee as a credit if the outcome is a losing outcome.

As shown, the customer device 200 includes a processor 210 connected to a communication port 220. The communication port 220 is configured to transmit data to the retailer controller 100 via a network connection, such as the World Wide Web, via an intermediate device, such as the above-described retailer terminal, via dedicated connection, or via another connection, and to receive data from the retailer controller 100. Also connected to the processor 210 are an input device 230 for receiving data and instructions from a customer, a display 240 for displaying data to the customer, and a printer 250 for creating a hardcopy of data, such as of a confirmation of a game outcome and associated terms for receiving a product. The input device 230, the display 240 and the printer 250 may comprise any of the input devices, displays, or printers discussed above.

A storage device 260 is also connected to the processor 210, and stores data and processor-executable process steps for the operation of the customer device 200. Specifically, the storage device 260 stores process steps of a program 261 which may be executed to control the customer device 200 to operate as described herein. The process steps of the program 261 may be stored in the storage device 260 during its manufacture, may be downloaded from a compact disc or other computer-readable medium, or may be retrieved from a remote or local source through the communication port 220 embodied in a signal having the process steps encoded thereon.

Also stored in the storage device 260 are processor-executable process steps of a web browser 262 which can be executed by the processor 210 to provide communication between the customer device 200 and a web server executing within the retailer controller 100 via the World Wide Web. Of course, depending on the communication media disposed between the customer device 200 and the retailer controller 100, other known applications or hardware may be needed for the customer device 200 to communicate with the retailer controller 100. Process steps of an operating system (not shown), such as the Palm® operating system, may also be stored in the storage device 260 and executed by the processor 210 to control basic operation of the customer device 200.

In some embodiments, the invention is embodied solely in the customer device 200, which may be given to customers upon entering a retail store. In these embodiments, the program 261 includes process steps executed by the processor 210 to receive a selection of a product from a customer, receive a fee to play a game, determine an outcome of the game, provide the product to the customer if the outcome is a winning outcome, and credit a portion of the fee to the customer if the outcome is a losing outcome. The program 261 also includes, according to these embodiments, process steps executable to identify a desired product, determine whether a game outcome and a fee are associated with the product, provide the product to a customer if the game outcome is a winning outcome, and determine a sale price based on the fee and charge the customer the sale price for the product if the game outcome is a losing outcome. The databases 500 to 700 are also stored in the storage device 260 according to some of these embodiments.

POS Terminal

Figure 4:
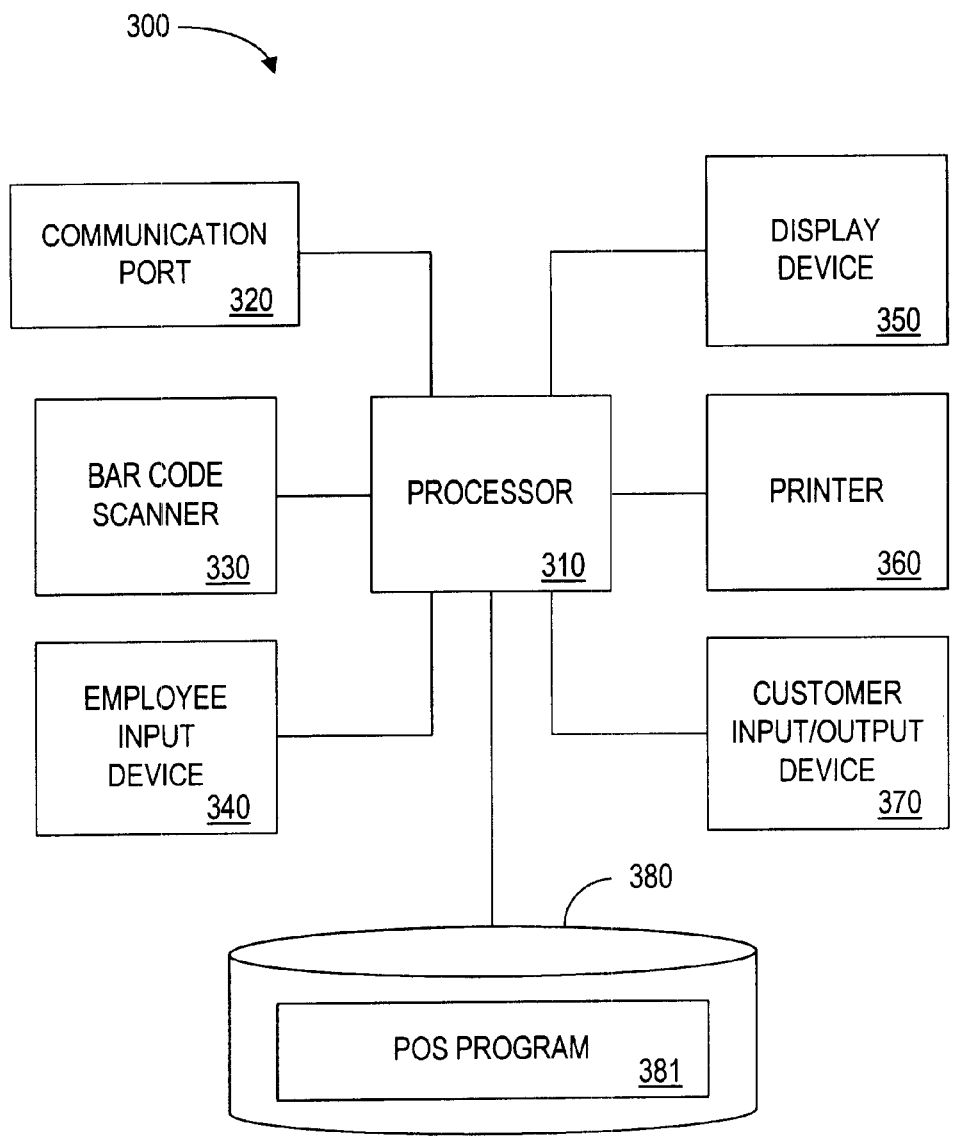
FIG. 4 is a block diagram of a point-of-sale (POS) terminal according to one embodiment of the present invention.

FIG. 4 is a block diagram showing several components of the POS terminal 300 according to one embodiment of the invention. According to one version of this embodiment, the POS terminal 300 receives a customer identifier from a customer who has brought products to the POS terminal 300 for the purpose of purchasing the products. The POS terminal 300 also identifies a product to be purchased by the customer, determines whether a game outcome and a fee are associated with the product, provides the product to a customer if the game outcome is a winning outcome, and determines a sale price based on the fee and charges the customer the sale price for the product if the game outcome is a losing outcome. Details and variations of the foregoing process are set forth below.

The POS terminal 300 of FIG. 4 includes a processor 310 for executing processor-executable process steps and a communication port 320 connected thereto for communicating with the retailer controller 100 over a network or a dedicated connection. The communication port 320 may be used to communicate directly with the customer devices 200, 201 and 202 and may also be used to communicate with other devices. Of course, in the latter embodiment, the communication port 320 is configured to provide communication interfaces compatible with the customer devices 200, 201 and 202 and the other devices.

Also connected to the processor 310 are a bar code scanner 330 for scanning a product bar code, usually located on product packaging, and for extracting a product identifier therefrom. Extracted product identifiers may include a Store Keeping Unit (SKU), a Universal Product Code (UPC) or a product identifier internal to the retailer. Many types of bar code scanners are known in the art, including a hand-held scanner and a fixed scanner across which a bar code is swiped.

An employee input device 340 is also connected to the processor 310. The employee input device 340 allows an employee to manually enter a product identifier into the POS terminal 300, and also provides cash register functionality. Accordingly, the employee input device 340 comprises a numeric keypad, function keys for invoking convenient functions, and may be embodied in a keyboard, a voice recognition unit, a touch screen, or other input system.

A display 350 is connected to the processor 310 and is used primarily to display prices to the employee and to the customer. In one embodiment, a price to be charged to the customer is displayed on the display 350 each time a bar code is scanned by the bar code scanner 330. After all desired products have been scanned, the display 350 displays a total price due to the retailer. The display 350 may comprise any of the above-mentioned displays. A printer 360 is primarily used to print receipts, representations of game outcomes, and/or coupons for presentation to a customer, and may comprise a thermal printer, a laser printer, an inkjet printer, or other type of printer.

Also connected to the processor 310 is a customer input/output device 370, which is used by a customer to enter a customer identifier and a payment identifier into the POS terminal 300. For example, the customer input/output device 370 may present a request to the customer to swipe her frequent buyer card or other retailer-affiliated card through a magnetic card reader of the customer input/output device 370. After the customer swipes her card and a customer identifier is read therefrom, the customer input/output device 370 may request the customer to swipe a credit or debit card through the card reader so as to provide a payment identifier using which the total price may be charged or a fee may be credited. Accordingly, the customer input/output device 370 may comprise a credit or debit card authorization terminal.

In other embodiments, the customer input/output device 370 is an interface port through which the customer device 202, such as a PDA, may communicate with the POS terminal 302. As such, the customer identifier and/or the account identifier may be directly transmitted from the customer device 202 to the POS terminal 302. The customer input/output device 370 according to this embodiment may also be used to receive outcome information, discussed in detail below, directly from the customer device 202.

A storage device 380 is connected to the processor 310, and stores processor-executable process steps of a POS program 381 which are executed by the processor 310 so as to allow the POS terminal 300 to operate in accordance with the present invention. As described above with respect to the storage device 260 and the storage device 160, the process steps of the POS program 381 may be stored in the storage device 380 during manufacture of the storage device 380, may be downloaded from a compact disc or other computer-readable medium, or can be retrieved from a remote or local source through the communication port 320 in the form of a signal having the process steps encoded thereon.

Databases

Customer Database

Figure 5:
FIG. 5 illustrates a tabular representation of a portion of a customer database according to one embodiment of the present invention.

FIG. 5 illustrates a tabular representation of a portion of the customer database 500 according to one embodiment of the present invention. The customer database 500 is used to store general information about a customer which may be used by a system according to the present invention. The information stored in the customer database 500 may be obtained by requiring a customer to submit a written registration form requesting certain customer information or by requiring the customer to complete fields of a registration web page transmitted to a customer device via the World Wide Web. In a case that the information is obtained through a written registration form, the information may be entered into the customer database 500 by an employee operating the input device 130 of the retailer controller 100. The information may also be submitted to the retailer controller 100 via telephone or electronic mail, or may be stored in the storage device 260 of the customer device 200 and transmitted therefrom to the retailer controller 100.

Each record shown in the illustrated portion of the customer database 500 includes several fields, the fields specifying: i) a customer identifier 510 preferably used throughout the databases of the data storage device 160 to relate data to an associated customer; ii) a name 520 of the associated customer; iii) contact information 530 for use in contacting the associated customer; iv) a payment identifier 540 associated with the customer; and v) a customer rating 550.

The customer identifier 510 may be assigned to a customer by the retailer controller 100 in response to the above-described written or Web-based registration, or in response to an indication by a customer of a desire to receive a product based on a game outcome. The customer identifier 510 may also be established upon receipt by the customer of a PDA, hand-held scanner, or other customer device provided by a retailer upon entry into a retail store.

The contact information 530, as shown, may include any type of information by which a retailer may contact a customer, such as a postal address, an electronic mail address, a telephone number, a facsimile number or the like. The payment identifier 540 may specify a credit card number, a checking account number, an online bill payment service or other account information using which the retailer may charge a fee, charge a sale price, and credit a portion of the fee to a customer.

The customer rating 550, in one embodiment, is based on an associated customer's purchasing history. For example, a customer having purchased items resulting in over $500 profit for a retailer in a past year is assigned a Gold customer rating 550, while a customer having purchased items resulting in less than $50 in profit is assigned a Bronze customer rating 550. A customer may also pay a fee in order to be associated with a particular customer rating. The customer rating 550 may be a numerical rating determined according to a rating algorithm or formula.

In one embodiment, the customer rating 550 is used to determine a probability that a game will result in a winning outcome. In this embodiment, a probability determined if the customer is associated with a Gold customer rating 550 may be greater than a probability determined if the customer is associated with a Bronze customer rating 550. In other embodiments, a probability may be determined based on a customer history of receiving winning outcomes stored in the customer database 500.

Product Database

FIG. 6 shows a tabular representation of a portion of the product database 600. The product database 600 contains information relating to products sold by a retailer operating the retailer controller 100. The information may be used to determine a fee required to play a game, a probability that the game will result in a winning outcome, and/or a portion of the fee credited if the game results in a losing outcome. Examples of the foregoing determinations are set forth below.

The fields of the product database 600 specify: i) a product identifier 610 uniquely identifying a product offered for sale by the retailer; ii) a manufacturer 620 of the product; iii) a model number 630 specified by the associated manufacturer 620 of the product; iv) a description 640 of the product; and v) a retail price 650 of the product.

In one embodiment, the product identifier 610 of a product is a value which may be extracted from a product bar code located on the product by a bar code scanner such as the bar code scanner 330 of the POS terminal 300. Of course, a product identifier 610 may reflect a value different from a value extracted from the product bar code, in which case a corresponding product identifier 610 may be determined based on a data table relating the extracted value with a product identifier 610.

The retail price 650 is, in one embodiment, a price for which an associated product is offered for sale absent any credit according to the present invention. It should be noted that the product database 600 may include revenue management information associated with each product therein. Revenue management information may include a cost of the product, an amount of the product in inventory, a number of days in inventory, an expiration date, etc, as described in the book "Revenue Management—Hard-Core Tactics for Market Domination" by Robert G. Cross. Such information may be used to determine a probability that a game played for the product will result in a winning outcome (poorer-selling products are associated with higher probabilities), a fee required to play the game, and/or a portion of the fee credited if the game results in a losing outcome.

Outcome Database

A tabular representation of a portion of the outcome database 700 is shown in FIG. 7. The outcome database 700 is used to determine whether to provide a product to a customer at no charge, whether to credit a portion of a fee to the customer, and an amount to be credited to the customer. The portion of the outcome database 700 illustrated in FIG. 7 includes fields specifying: i) a customer identifier 710 identifying a customer of the customer database 500 to which the illustrated portion is associated; ii) a product identifier 720 identifying a record in the product database 600; iii) an outcome 730; and iv) a fee paid 740.

The outcome 730 associated with a product identifier 720 specifies whether a game played for the product identified by the product identifier 720 resulted in a winning outcome or a losing outcome. As shown, "win" denotes a winning outcome and "lose" denotes a losing outcome. As described herein, the product may be provided to the customer at no charge if a "win" outcome 730 is associated with the product.

The fee paid 740 specifies a fee paid by a customer to initiate a game resulting n the associated outcome 730. As will be described in more detail below, the fee paid 740 may be determined by a customer, in which case the retailer controller 100 determines a probability that the game will result in a winning outcome. In some embodiments, a portion of the fee paid 740 is credited to the customer if a "lose" outcome is associated with the fee paid 740. The credited portion of the fee may be equal to the entire fee paid 740, and may be applicable to a purchase of a product identified by an associated product identifier 720, a purchase of any product offered by the retailer, or may be simply credited to a financial account of the customer. Moreover, the credited portion may differ depending on a customer rating 550, a customer history of receiving winning outcomes, on revenue management information, or on other factors. In a case that a fee paid 740 is associated with a "win" outcome 730, the fee paid 740 may or may not be credited, in any of the above manners, to the customer. Use of the outcome database 700 as shown FIG. 7 will be described in detail below with respect to FIG. 11.

Processes

Figure 8:
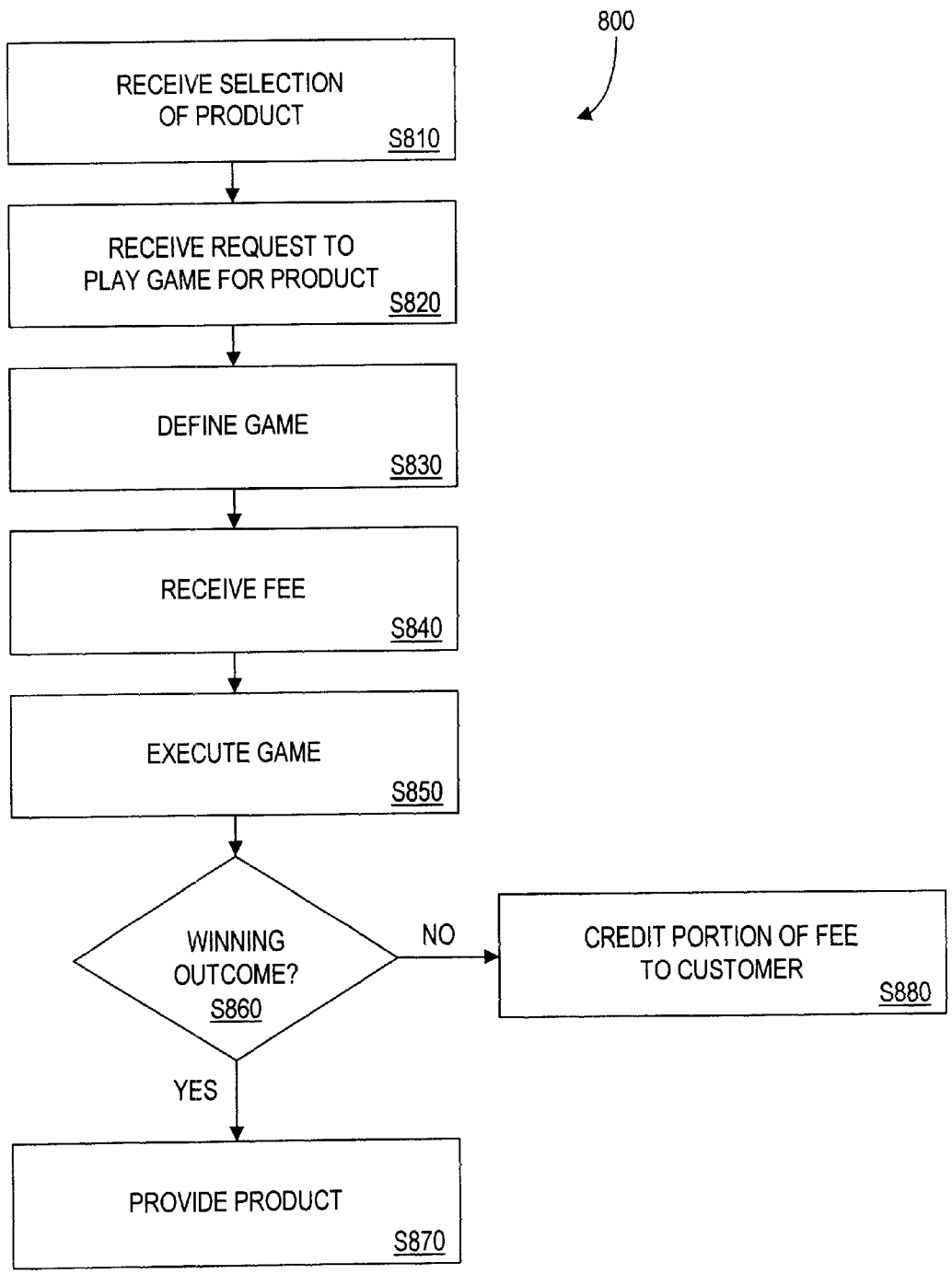
FIG. 8 is a flow chart of process steps to provide a product according to one embodiment of the present invention.

FIG. 8 is a flow chart of process steps according to one embodiment of the present invention. In a case that the retailer controller 100 performs the process steps 800, the process steps 800 may be embodied in hardware within the retailer controller 100, in processor-executable process steps stored on a computer-readable medium such as the data storage device 160 and executed by the processor 110, in processor-executable process steps encoded in an electronic signal received by the retailer controller 100 and executed by the processor 110, or in any combination thereof. It should be noted that the process steps 800 may be performed wholly or in part by the processor 210 of the customer device 200 or by the processor 310 of the POS terminal 300 once a customer approaches the POS terminal 300 to purchase desired products. In a case that the customer device 200 performs the process steps 800, the customer device 200 may be a PDA or a hand-held scanner provided by a retailer and having the process steps stored therein, or the customer device 200 may be owned by a customer and capable of receiving the process steps 800 from an outside source, such as the retailer controller 100.

Briefly, the process steps 800 include receipt of a selection of a product from a customer, receipt of a fee to play a game, determination of an outcome of the game, provision of the product to the customer if the outcome is a winning outcome, and credit of a portion of the fee to the customer if the outcome is a losing outcome.

Initially, in step S810, a selection of a product is received from a customer. For example, in an embodiment in which the customer is physically present in a retail store, the selection is received when a customer uses a customer device, such as an in-store kiosk, a PDA or other hand-held device in communication with the retailer controller 100 via the World Wide Web or another type of network, to locate and request information regarding a product. A selection may also be received once the customer uses a customer device to indicate an intent to purchase a product by adding the product to a virtual "shopping cart", or once a desired product is identified by a POS terminal during customer checkout procedures, which are described in detail with respect to FIG. 11.

An employee of a retailer may receive an instruction from a customer to provide game play for a product in accordance with the invention, in which case the employee may operate the input device 130 so that the retailer controller 100 receives a selection of the product in step S810. The customer may use a hand-held device owned by the customer or provided by a retailer to scan a product bar code on a product, in which case a product identifier extracted from the bar code and transmitted to the retailer controller 100 is received in step S810 as a selection of the product. The retailer controller 100 may also receive a selection of a product by detecting placement of the product in a real shopping cart associated with the customer. In addition, the retailer controller 100 may track a customer's location within a retail store and receive a selection of a product if the customer approaches the product or if it is determined that the customer is located near to the product for a specified amount of time, thereby suggesting that the customer is evaluating the product. Additionally, the selection received in step S810 may include a commitment by a customer to purchase a product.

In an online embodiment of step S810, a customer's initial request to access a home page of a website operated by a retailer or an indication that a web page describing the product has been viewed for a particular period of time may each be considered a selection of a product. Of course, selection of a picture or a description of a product displayed on a web page of the website, addition of a product into a virtual shopping cart, or an indication of a desire to purchase a product may each be considered a received selection of a product in step S810.

The product selected in step S810 may be selected from among all products offered by a retailer or from among a particular set of products identified by the retailer. Determination of the particular set of products may be based on a purchasing history of the customer, on purchasing histories of all customers, on inventory, or on other revenue management information.

A request to play a game for the selected product is received in step S820. The request may be received from the customer device 200, such as a PDA or a dedicated kiosk providing game functionality according to the invention. A selection of a product received in step S810 may be considered a request to play a game in step S820. In some embodiments, only those customers meeting an eligibility standard, such as a minimum customer rating 550, are eligible to play a game for products according to the invention. Therefore, step S820 may also include determination of whether the customer from whom the request was received meets the eligibility standard.

Next, in step S830, a game which will be played for the selected product is defined. In one embodiment, the type of game is initially determined based on a selection by a customer of one of several games, or determined from among the several games based on other criteria. These criteria may include a number of winning outcomes and a probability of each winning outcome reflected by each of the several games. The type of game may also be predetermined. In some embodiments, the type of game determined in step S830 is a game for which a probability of a winning outcome is controllable or known, such as a slot machine game or a lottery-type game.

After determination of the game, several elements of the game may be defined in step S830. These elements may include a fee required from the customer to play the game, a maximum number of times for which the customer will be allowed to play the game for the selected product, game outcomes which will be considered winning outcomes, and probabilities of receiving winning outcomes. Each of these factors may be defined independently or based on one another. For example, the required fee may determine the maximum number of times for which the customer will be allowed to play the game. More specifically, if a $1 fee is required to play a game for a product having a retail price of $20, the maximum number of times for which the customer will be allowed to play the game may be determined to be $20/$1=20 times.

In another example, a probability of receiving a winning outcome may be determined based on an effective discount which the retailer is willing to provide on the selected product. An effective discount is a difference between a retail price of a product and a total amount of fees received from a customer prior to winning the product. According to one example, if a customer wins a $20 product and receives a refund for any spent fees, and nine other customers each spend a total of $20 in fees and are thereafter provided the product, the resulting effective discount is $20−[(9×$20)/10]/$20=10%. An effective discount may be determined using revenue management information.

In one embodiment of step S830, the determined game results in a winning outcome if the retailer controller 100 randomly selects a single white ball from a bin of black balls. The bin may be a real bin or an electronic representation of a bin. In a specific example of this game, the customer has selected, in step S810, a product having a $20 retail price and it has been already determined in step S830 to require a $1 fee from the customer. Moreover, it has been determined in step S830 that the entire fee will be credited to the purchase of the product if the game results in a losing outcome, and that the retailer will provide a 5% discount on products for which a game is played according to the invention. It should be noted that the discount may be provided to customers in view of expected increases in sales due to the invention. To determine a number of black balls to place in the bin, the foregoing formula is used in this example:

$$E(AmountWon) = (.05)(\$20) = \sum_{i=1}^{19} \frac{1}{b+1}(i)$$

where b represents the number of black balls added to bin with a single white ball and E(Amount Won) is an expected amount to be won by the customer. According to the foregoing values, 189 black balls must be placed in the bin, resulting in a 1/190 probability of receiving a winning outcome.

In another embodiment, the customer chooses to play 5-card stud video poker for an automobile having a $40,500 retail price. It is then determined in step S830 that a $2000 fee is required for each play of the game, and that the entire fee will be credited to the purchase of the product if the game results in a losing outcome. In order to determine a minimum poker hand which will be considered a winning outcome, taken into consideration are odds of receiving various poker hands, a number of games the customer may play before having credits equal to the retail price, and a 2% effective discount which the retailer is willing to provide. Specifically, these factors are used to determine a desired probability of winning outcomes using, e.g., the formula:

$$E(AmountWon) = (.02)(\$40,500) = \sum_{i=2000}^{40,500} (Odds)(i)$$
$$\text{in 2000 increments}$$

According to the above formula, the desired probability is 0.193%. Therefore, and because a probability of receiving a full house or better and a flush or better in 5-card stud poker are 0.169% and 0.366%, respectively, a winning outcome is determined in step S830 to be a hand reflecting a full house or better.

In the above two examples, a retailer is willing to discount products by a certain amount in return for increased revenue resulting from a more entertaining shopping experience provided by the invention. As such, a probability of a winning outcome is determined so that, in view of a fee required to play a game, a portion of the fee credited towards the retail price of a selected product, and a number of times a customer may play the game before the amount credited equals the retail price, an expected amount won reflects the discount amount.

In other embodiments, a fee required to play a game is determined in step S830 based on the determined type of game, on a retail price of the product selected in step S810, and on a portion of the fee to be credited to customers receiving a losing outcome. For example, if the determined game reflects a known 0.1% probability that a winning outcome will result, the selected product has a retail price 650 of $450.00, and 90% of received fees are credited to losing customers, the fee may be determined to be (0.001× $450.00)/(1−0.9)=$4.50. By determining the fee in this manner, a product won by a customer may be funded by retained portions of fees received from losing customers.

Of course, the required fees may be determined using other methods. As described above, a system according to the present invention may credit an entire received fee to a losing customer. Accordingly, fees may be determined in this embodiment such that products won by customers are funded by an increase in profit resulting from increased volume due to the invention. In other embodiments, determination of the fee is also based on portions of fees which are credited to losing customers but never redeemed, and/or on fees received from winning customers, in a case that such fees are retained.

Flow proceeds from step S830 to step S840, wherein the determined fee is received. The fee may be received in step S840 by using a payment identifier 540 corresponding to the customer or by receiving other forms of payment from the customer.

In some embodiments, the fee is received prior to step S830. For example, the customer may pay the fee, at the POS terminal 300 or by using the customer device 200 to debit an electronic account, before receiving an indication of a required fee. Therefore, according to these embodiments, the customer determines the required fee. Accordingly, after the reception of a fee in this manner, a probability that a game will result in a winning outcome is determined based thereon in step S830. The probability may be determined using factors such as those described above with respect to determination of the fee. Assuming a retail price 650 of $450.00 and crediting of 90% of received fees, receipt of a $2.25 fee prior to step S830 may result in a determined probability of $2.25(1−0.9)/$450.00=0.05%.

The defined game is executed in step S850 and it is determined in step S860 whether the outcome of the game was a winning outcome. If so, flow proceeds to step S870, wherein the selected product is provided to the customer. The product may be provided by handing or shipping the product to the customer or, as described with respect to FIG. 11, by processing a sale of the product without billing the customer for the product. As described above, the received fee is credited to the customer according to some embodiments of step S870.

In one embodiment, step S870 includes populating a record of the outcome database 700 in accordance with the winning outcome. For example, a record of the outcome database 700 associated with the customer (by virtue of the customer identifier 710) is created including a product identifier 720 identifying the selected product, a "win" outcome 730 and a fee paid 740 equal to the fee received in step S840.

If the outcome is not determined to be a winning outcome in step S860, flow continues from step S860 to step S880, wherein a portion of the fee received in step S840 is credited to the customer. The credited portion may consist of the entire fee received. In addition, the credited portion may be applicable only toward a purchase of the selected product, toward a purchase of another product offered by the retailer, toward a purchase of any product offered by the retailer or affiliated retailers, or may be credited directly to a financial account identified by a payment identifier 540 associated with the customer.

Figure 11:
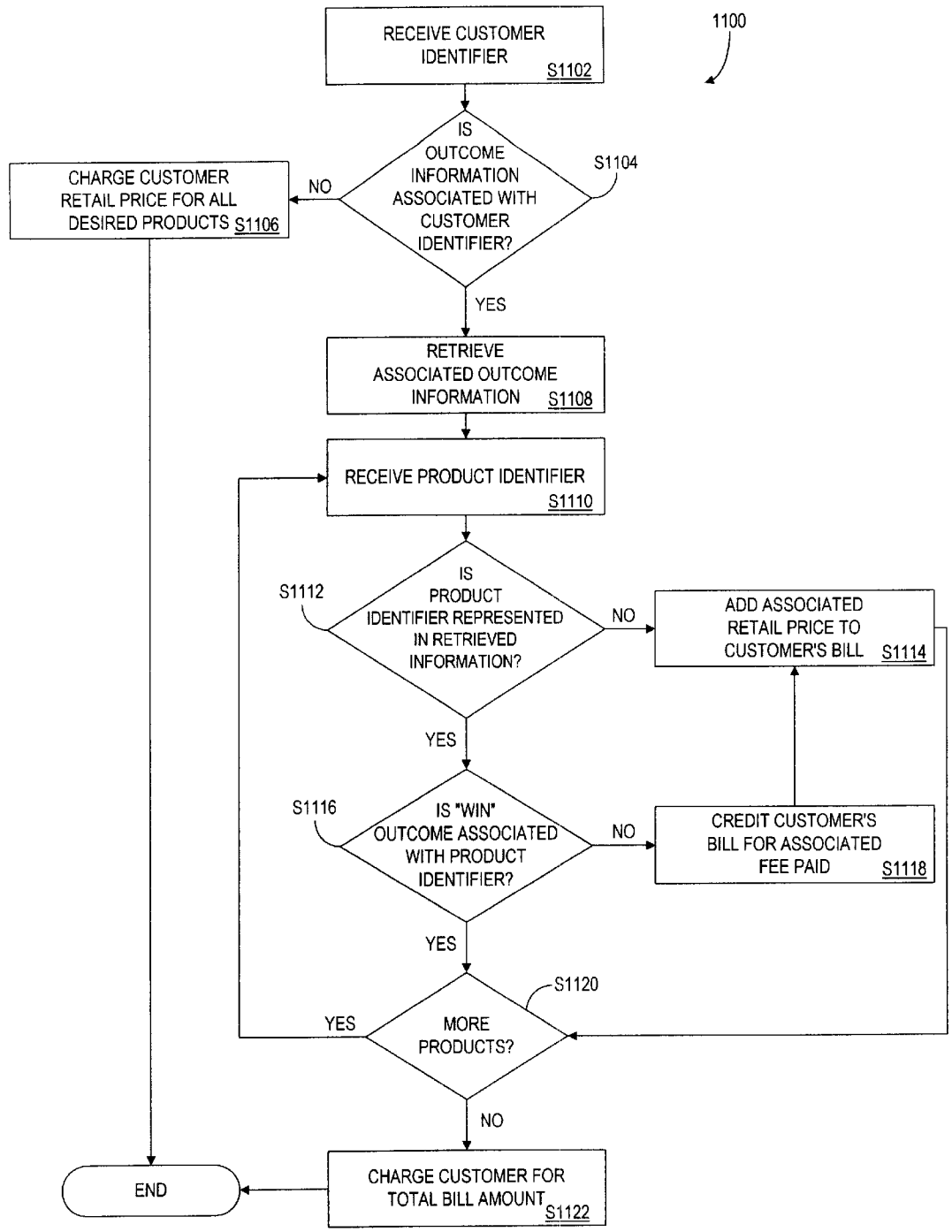
FIG. 11 is a flow chart of process steps to provide a product according to one embodiment of the present invention.

Step S880 may also include creating a record in the outcome database 700 representing the losing outcome. Such a record specifies the product identifier 720 of the selected product, a "lose" outcome 730, and a fee paid 740 reflecting the fee received in step S830. One embodiment for using the outcome database 700 to credit the fee and to provide the product is illustrated in FIG. 11.

After step S870 or step S880, an additional fee may be received for re-execution of the game in step S850. After each re-execution resulting in a losing outcome, an associated fee paid 740 of the outcome database 100 is incremented by the additional fee paid. In such an embodiment, a game may be re-executed until a total amount to be credited to a customer equals a retail price of the selected product. Once this point is reached, the customer is simply provided with the product.

In other embodiments, a customer accumulates credit towards a future purchase of a product by re-executing a game as described above. For example, a first five $1 fees credited to the customer are usable only towards a purchase during a future visit, but an accumulation of more than five $1 fees are usable towards a current purchase. This feature may motivate customers to re-execute the game more than five times in an attempt to receive a winning outcome.

Figure 9:
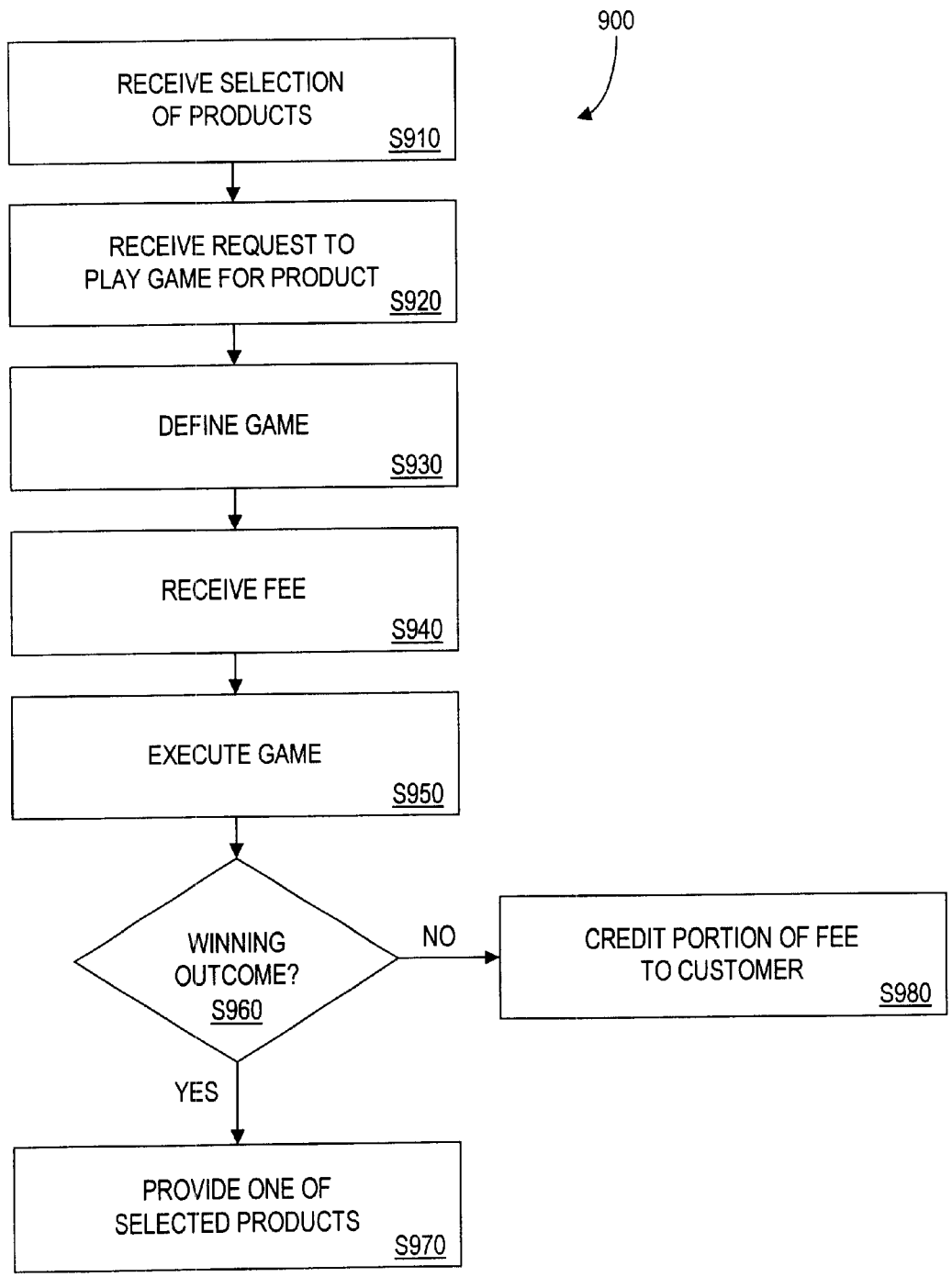
FIG. 9 is a flow chart of process steps to provide a product according to one embodiment of the present invention.

FIG. 9 shows a flow chart of process steps 900 to provide products in accordance with the present invention. The process steps 900 may be embodied similarly to the process steps 800.

The process steps 900 begin at step S910, wherein a selection of a plurality of products is received. The selection may be received in step 910 in any of the manners described above with respect to step S810. A request to play a game is received in step S920, a game is defined in step S930, and a fee is received in step S940 as described above with respect to step S820, step S830 and step S840. However, the game defined in step S930 may have several winning outcomes, with each winning outcome corresponding to one of the selected products, with one winning outcome applicable to all the products or any of the products, or with any combination thereof. As described with respect to step S930 and step S940, probabilities of respective winning outcomes resulting from the game may be determined based on a fee received in step S940, or the fee may be based on the probabilities. In one embodiment, the determination of probabilities for each selected product may be determined using known Monte Carlo simulation techniques. Additionally, selected products may fall within certain tiers of a price structure (e.g. product one is a $20 to $30 item, products two, three and four are $200 to $250 items, and product five is a $10,000 to $15,000 item) and probabilities may be predetermined based on the tiers rather than on the individual products.

Returning to the ball selection example of FIG. 8, a customer may select in step S910 a $15,000 car, a $200 VCR and a $100 MP3 player. Assuming that the retailer is willing to discount each product by 10%, 5% and 5% respectively, balls required to represent appropriate probabilities of winning outcomes for each item are: one ball representing the car; 23,000 balls representing the VCR; 280,000 balls representing the MP3 player; and 110,000,000 black balls.

Like the single product ball selection game described above, the respective numbers of balls were calculated so that a retailer accepting a $1 fee and crediting the entire fee towards the purchase of any selected product will not provide effective discounts for the selected products which are greater than the respective discount percentages. In one embodiment of the foregoing example, the customer must accept a lowest-priced product of the selected products at no additional charge once an amount of fees received from the customer equals a retail price of the lowest-priced product. The customer must then start a new game if she wishes to continue to play a game for the remaining products. The game is executed in step S950 and it is determined in step S960 whether a resulting outcome is a winning outcome. If the outcome is a winning outcome, one of the selected products is provided to the customer in step S970 as described above with respect to step S870. It should be noted that a winning outcome may allow the customer to receive one or more particular products of the products selected in step S910. In one example, products associated with the product identifiers 610 P0001, P0003 and P0004 are selected in step S910. If a winning outcome corresponding to each product is determined in step S960, records are created in the outcome database 700 specifying the product identifiers 720 P0001, P0003 and P0004 and associating each product identifier with a "win" outcome 730. If, however, the winning outcome corresponds only to the product identifier 720 P0001, a "win" outcome 730 is associated with the product identifier 720 P0001 and a "lose" outcome 730 is associated with each of the product identifiers 720 P0003 and P0004. The latter scenario may result from a game such as the ball selection game described above, in which one ball corresponding to the product identified by the product identifier 720 P0001 is selected in step S950.

If it is determined in step S960 that the game did not result in a winning outcome, the received fee is credited to the customer in step S980. The fee may be credited in step S980 towards a purchase of a particular one of the selected products, towards the purchase of any of the selected products, towards purchases of any products provided by the retailer, towards the purchase of any product offered by the retailer and/or affiliated retailers, or to a financial account corresponding to a payment identifier 540 associated with the customer.

In one embodiment, step S980 includes creation of records in the outcome database 700 representing the losing outcome. The records each specify a product identifier 720 of one of the selected products, a "lose" outcome 730, and a fee paid 740 reflecting the fee received in step S830.

Figure 10:
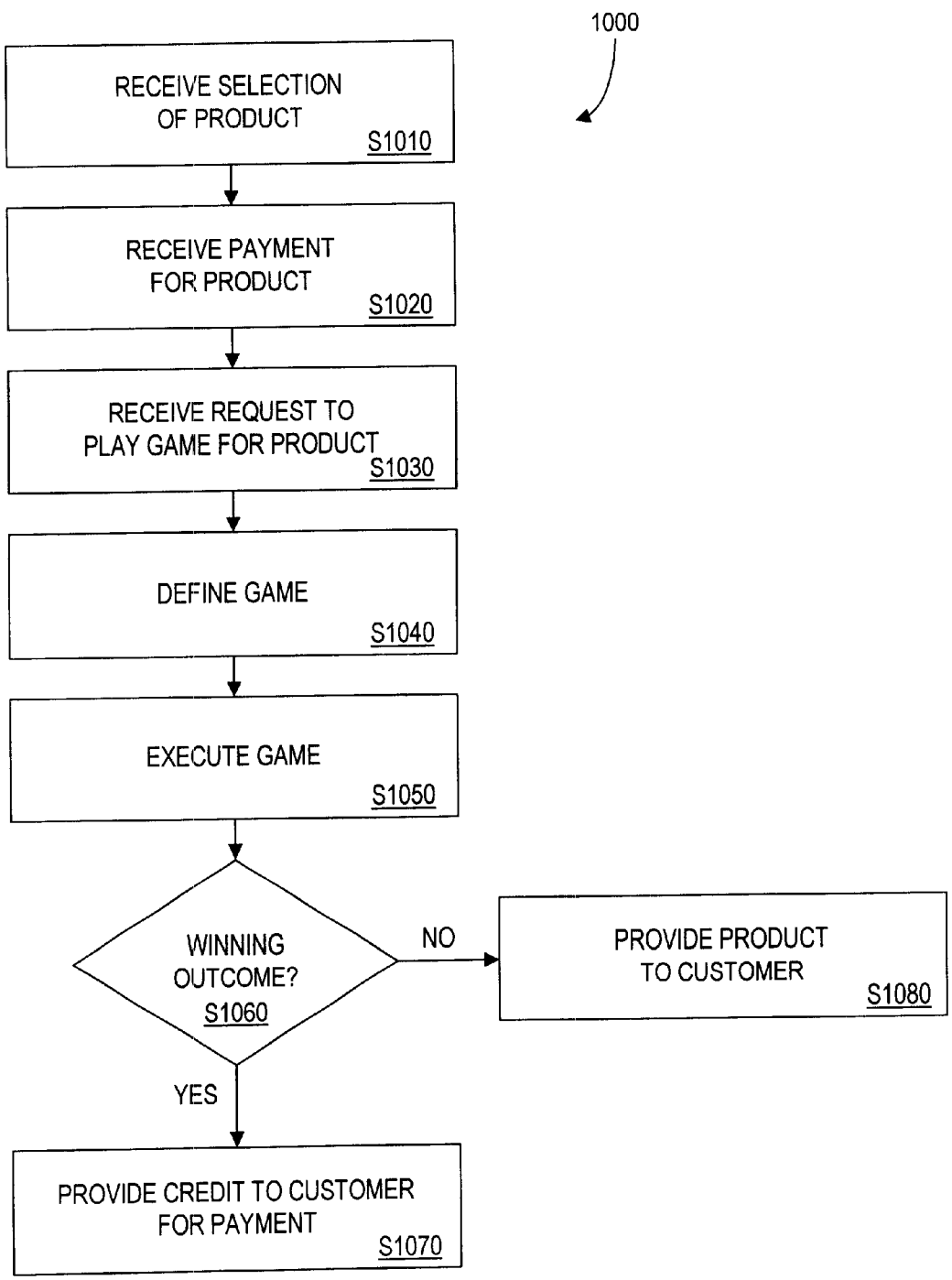
FIG. 10 is a flow chart of process steps to provide a product according to one embodiment of the present invention.

FIG. 10 illustrates process steps 1000 to provide a product according to another embodiment of the present invention. The process steps 1000 may be embodied in processor-executable process steps stored in the storage device 160 of the retailer controller 100. As described with respect to the process steps 800 and the process steps 900, the process steps 1000 may also be embodied in the POS program 381 of the POS terminal 300 or the program 261 of the customer device 200. It should be noted that the process steps 1000 may be executed by a combination of the processor 110, the processor 210, the processor 310 or other processors.

The process steps 1000 include reception of a sale price of a product from a customer, provision of the product to the customer in exchange for the sale price, determination of an outcome of a game, and credit of a portion of the sale price to the customer if the outcome is a winning outcome. Advantageously, these features provide incentives to customers to purchase products in view of the possibility of receiving a credit for a portion of the sale price.

The process steps begin at step S1010, wherein a selection of a product is received. Although selection of the product may be received in step S1010 as described with respect to step S810 and step S910, the selection of the product S1010 is received in the present example by the POS terminal 300 in response to the bar code scanner 330 scanning a product bar code corresponding to the product.

Once the selection is received in step S1010, a payment for the product is received in step S1020. The payment may be received using a payment identifier 540 associated with a customer identifier 510 received by the customer input/output device 370 from a customer device 202 or through manual input by the customer using the customer input/output device 370.

Flow proceeds through steps S1030 and S1040 as described with respect to steps S830 and S840. Specifically, a request to play a game for the selected product is received in step S1030 and the game is defined in step S1040. It should be noted that, according to some embodiments, definition of a game in step S 1040 does not include determination of a required fee. If a required fee is determined, the fee is received in step S1040.

The defined game is executed in step S1050. If it is then determined in step S1060 that the game resulted in a winning outcome, a credit is provided to the customer for the received payment in step S1070. The credit may consist of the entire received payment or a portion thereof, such as the entire payment minus a transaction fee. Flow then continues to step S1080, wherein the selected product is provided to the customer. If it is determined in step S1060 that the game did not result in a winning outcome, flow proceeds directly to step S1080.

In some embodiments, a portion of a fee received from the customer in step S1040 is credited to the customer in step S1080 if the game outcome is a losing outcome. The credited portion may consist of the entire fee received, and may be applicable only toward a purchase of another product offered by the retailer, toward a purchase of any product offered by the retailer or affiliated retailers, or may be credited directly to a financial account identified by a payment identifier 540 associated with the customer.

FIG. 11 illustrates process steps 1100 according to an embodiment of the invention in which desired products are purchased according to a "checkout" process. The checkout process may be performed by the POS terminal 300 in a traditional retail store embodiment, by the retailer controller 100 in an online embodiment, and/or by the customer device 200 located either in a retail store or remote from a retail store. More specifically, the process steps 100 may be executed by either of the processor 110, the processor 210 and the processor 310.

Generally, the process steps 1100 include identification of a desired product, determination of whether a game outcome and a fee are associated with the product, provision of the product to a customer if the game outcome is a winning outcome, and determination of a sale price based on the fee and charge to the customer of the sale price for the product if the game outcome is a losing outcome.

The process steps 1100 begin at step S1102, in which a customer identifier is received. In one embodiment of step S1102 described briefly above, a customer arrives at the POS terminal 300 of a retail store with several desired products, intending to pay for the products and thereafter to leave the retail store with the products. At the POS terminal 300, the customer input/output device 370 displays a message to the customer instructing the customer to swipe her preferred customer card through a magnetic card reader provided with the device 370.

The card reader reads a magnetic strip located on the card in order to receive the customer identifier in step S1102. Alternatively, the customer may swipe a credit or debit card through the magnetic card reader, which retrieves a payment identifier from the card and uses the payment identifier to locate an associated customer identifier 510 in the customer database 500. The latter arrangement allows the customer to complete a purchase using only one card.

Next, in step S1104, it is determined whether outcome information is associated with the received customer identifier. In one embodiment, the outcome database 700 is examined to determine whether it includes records associated with a customer identifier 710 identical to the received customer identifier. If not, flow continues to step S1106, wherein a product identifier of each desired product is determined using the bar code scanner 330, a retail price for each product is determined by locating a retail price 650 associated with the product identifier, the customer is charged for the associated retail prices using the payment identifier, a receipt is printed using the printer 360, and the customer departs the retail store with the desired products.

It should be noted that, in an online embodiment, the foregoing example may differ in that the customer identifier would be retrieved based on input payment information, address information, a logon identifier or the like, the desired products would be represented by respective product identifiers in a data structure representing a virtual shopping cart, and the products would be shipped to the customer or made available to the customer for pickup at a retail store.

If it is determined in step S1104 that outcome information is associated with the received customer identifier, the outcome information is retrieved in step S1108. Specifically, records having an associated customer identifier 710 identical to the customer identifier received in step S1102 are copied from the outcome database 700 to the storage device 380 for fast access to the data therein.

In another embodiment of steps S1102, S1104 and S1108, the customer device 202 simply transmits outcome information such as that shown in FIG. 7 to the POS terminal 302 through the customer input/output device 370.

In step S1110, a product identifier of one of the desired products is received. In one embodiment, the product identifier is received by scanning a product bar code corresponding to a desired product, which is located either on the product or on the product's packaging. Once the product identifier is received, it is determined in step S1112 whether the product identifier is represented in the retrieved outcome information. More particularly, it is determined whether the product identifier is a product identifier 720 listed in one of the records retrieved in step S1108. If not, the retail price 650 associated with the product identifier in the product database 600 is determined and the retail price is added to the customer's bill in step S1114. Flow then continues to step S1120.

If it is determined that the received product identifier is represented in the retrieved outcome information, it is determined in step S1116 whether a "win" outcome 730 is associated with the received product identifier. If a "win" outcome 730 is not associated with the received product identifier, the customer's bill is credited for a portion of the associated fee paid 740 in step S1118. Flow then proceeds to step S1114 wherein an associated retail price 650 is added to the customer's bill as described above.

As an example of the foregoing, if the information reflected in FIG. 7 is retrieved in step S1108 and the product identifier 720 P0003 is received in step S1110, it is determined in step S1116 that a "win" outcome 730 is not associated with the product identifier. Accordingly, the customer's bill is credited for $400 (the fee paid), and the associated retail price 650 of $40,500 is added to the customer's bill in step S1114.

On the other hand, if it is determined that a "win" outcome 730 is associated with the product identifier in step S1116, flow proceeds to step S1120. It should be noted that flow proceeds from step S1116 to step S1120 because the customer has won the product associated with the received product identifier and therefore the customer's bill is not affected by a retail price of the product.

If it is determined in step S1120 that no more products remain, flow continues to step S1122 wherein the customer is charged the total billed amount. The amount may be charged to the customer using the payment identifier 540 associated with the customer identifier received in step S1122, or using other known means. Flow returns to step S1110 for reception of a next product identifier if it is determined in step S1120 that more products remain.

Although the process steps 1100 are described above with respect to a traditional checkout process within a retail store, it should be understood that the process steps 1100 are also applicable to the sale of products in an online environment, with or without variation.

Additional Embodiments

The following are several examples of additional embodiments of the present invention. These examples do not constitute a definition of all possible embodiments, and those skilled in the art will understand that the present invention is amenable to many other embodiments. Those skilled in the art will understand how to make any changes, if necessary, to the above-described system to accommodate these and other embodiments and applications.

In one embodiment, a credit of a portion of a fee or a sale price may be restricted in ways additional to those specified above. For example, a value of a credit may expire, or otherwise change over time, or a credit may be applicable only toward those products purchased over a particular time period, such as one day. These restrictions likely provide a retailer with additional revenue because they increase a likelihood that a credit will not be redeemed.

In addition to receiving a credit in response to a losing outcome, a customer may receive a consolation prize. The consolation prize, such as a coupon, is intended to provide further incentive for the customer to patronize the retailer.

In another embodiment, a product is selected and a game executed while a customer is at one location, such as a casino, and the product is provided at another location, such as a retail store. Alternatively, the customer may select products at a retail store using a PDA and take the PDA, now storing information regarding to the selected products, to a payment or fulfillment house for execution of a game and provision of credits and/or prizes according to the invention.

All types of credit mentioned above may be provided to a customer in coupon form, with the coupons specifying any restrictions for redeeming associated credit.

Instead of selecting a product, a customer may select a price for which to play a game. The game may be defined as described above with respect to step S830 and, if a winning outcome results, the customer may receive a credit for the selected price (or for a portion thereof) applicable to any product in a retail store. Of course, a probability of a winning outcome, a required fee for the game, an amount of the selected price credited in response to a winning outcome, and an amount of the fee credited in response to a losing outcome may each be varied in accordance with particular goals of a retailer.

In yet another embodiment, a customer may take a product from a retail store and play a game for the product according to the invention at a later date. If the customer does not win the product by a certain time, the customer is charged a sale price which is based on any fees paid by the customer in order to play the game for the product.

In order to select a product, to commit to purchase a product, to request a purchase of a product, or to purchase a product, a customer may swipe an appropriate card bearing a magnetic strip through a card reading device located near the point of display of the product. A product identifier corresponding to the product and a customer identifier read from the magnetic strip are then associated in the storage device 160 of the retailer controller 100. Accordingly, a product identifier corresponding to each subsequently-selected product is also associated with the customer identifier in the data storage device 160. In this regard, each product may be assigned a separate card reading device designed to transmit to the retailer controller 100 only a product identifier corresponding to a single associated product, or the card reading device may have an additional input device which the customer uses to input a product identifier corresponding to a selected product or to input other information using which the product identifier may be determined.

In one embodiment, received fees are credited according to a progressive pool of fees. Therefore, a portion of a fee credited to a customer is dependent upon game outcomes received by other customers.

In another embodiment, an encoded outcome is delivered to a customer through a flyer, a newspaper insert, an online advertisement, or the like. Then, in order to play a game for a product, the customer visits a retail store with the encoded outcome. After receiving a selection of a product and a required fee, the retail store decodes the encoded outcome to identify either a winning outcome or a losing outcome. Finally, the customer receives the selected product or is credited a portion of the fee as described above.

In embodiments where any of the process steps 800 are executed at a POS terminal, an average transaction time per checkout may increase. Accordingly, in order to decrease transaction times, a feature may be provided for prohibiting play of a game according to the invention. The feature may allow a retailer to manually control prohibition of play and/or may be employed automatically upon detection of undesirably long transaction times or checkout lines. Advantageously, such a feature encourages customers to visit the retailer during low traffic times because the customers will be aware that game play for products may be prohibited during high traffic times.

Although the present invention has been described with respect to particular embodiments, those skilled in the art will note that various substitutions and modifications may be made to those embodiments without departing from the spirit and scope of the present invention.

What is claimed is:

1. A method for providing a product, comprising:
   receiving a selection of a product from a customer, the product being selected from a plurality of products that are brought to a POS terminal by the customer;
   receiving a fee to play a game;
   determining an outcome of the game;
   providing the product to the customer if the outcome is a winning outcome; and
   crediting a portion of the fee to the customer if the outcome is a losing outcome.

2. A method according to claim 1, wherein the selected product is one of a plurality of selectable products.

3. A method according to claim 1, further comprising:
   receiving an instruction from the customer to play the game.

4. A method according to claim 1, further comprising: determining the fee.

5. A method according to claim 4, wherein the fee is determined based on the product.

6. A method according to claim 5, wherein the fee is determined based on the customer.

7. A method according to claim 1, wherein the portion of the fee credited is equal to the fee.

8. A method according to claim 7, wherein the credited portion is applicable only to a sale price of the product.

9. A method according to claim 1, wherein receiving a selection comprises:
   receiving a commitment from the customer to purchase the product.

10. A method according to claim 1, wherein the game reflects a probability that a winning outcome will result.

11. A method according to claim 10, wherein the probability is based on a customer profile.

12. A method according to claim 10, wherein the probability is a first probability if the selection was received from a first customer and is a second probability if the selection was received from a second customer.

13. A method according to claim 10, further comprising: receiving the probability from the customer.

14. A method according to claim 13, further comprising: determining the fee based on the received probability.

15. A method according to claim 10, further comprising: determining the probability based on the received fee.

16. A method according to claim 1, wherein the credited portion is applicable only to a sale price of the product.

17. A method for providing a product, comprising:
   receiving from a customer a selection of a plurality of products which are brought to a POS terminal by the customer;
   receiving a fee to play a game;
   determining an outcome of the game;
   providing one of the plurality of products to the customer if the outcome is a winning outcome; and
   crediting a portion of the fee to a sale price of one of the plurality of products if the outcome is a losing outcome.

18. A method according to claim 17, wherein a first portion of the fee is credited to a first sale price of a first one of the plurality of products or a second portion of the fee is credited to a second sale price of a second one of the plurality of products.

19. A method according to claim 17, further comprising:
   receiving an instruction from the customer to play the game.

20. A method according to claim 17, further comprising: determining the fee.

21. A method according to claim 20, wherein the fee is determined based on the plurality of products.

22. A method according to claim 21, wherein the fee is determined based on the customer.

23. A method according to claim 17, wherein the portion of the fee credited is equal to the fee.

24. A method according to claim 23, wherein the credited portion is applicable only to a sale price of one of the plurality of products.

25. A method according to claim 17, wherein the step of receiving a selection comprises:
   receiving a commitment from the customer to purchase one of the plurality of products.

26. A method according to claim 17, wherein the game reflects a probability that a winning outcome will result.

27. A method according to claim 26, wherein the probability is based on a customer profile.

28. A method according to claim 26, wherein the probability is a first probability if the selection was received from a first customer and is a second probability if the selection was received from a second customer.

29. A method according to claim 26, further comprising:
   receiving the probability from the customer.

30. A method according to claim 29, further comprising:
   determining the fee based on the received probability.

31. A method according to claim 26, further comprising:
   determining the probability based on the received fee.

32. A method according to claim 17, wherein the credited portion is applicable only to a sale price of one of the plurality of products.

33. A method according to claim 17, wherein each of the plurality of products is associated with a respective winning outcome.

34. A method according to claim 33, wherein the product provided is associated with the winning outcome.

35. A method for providing a product, comprising:
   identifying a desired product, the desired product being from a plurality of products that are brought to a POS terminal by a customer;
   determining whether a game outcome and a fee are associated with the product;
   providing the product to the customer if the game outcome is a winning outcome;
   determining a sale price based on the fee; and
   charging the customer the sale price for the product if the game outcome is a losing outcome.

36. A method for providing a product, comprising:
   identifying a desired product, the desired product being from a plurality of products that are brought to a POS terminal by a customer;
   determining whether a game outcome is associated with the product;
   providing the product to the customer if the game outcome is a winning outcome;
   determining a sale price; and
   charging the customer the sale price for the product if the game outcome is a losing outcome.

37. Processor-executable process steps embodied in a computer-readable medium, the process steps comprising:
   a receiving step to receive a selection of a product from a customer, the product being selected from a plurality of products that are brought to a POS terminal by the customer;
   a receiving step to receive a fee to play a game;
   a determining step to determine an outcome of the game;
   a providing step to provide the product to the customer if the outcome is a winning outcome; and
   a crediting step to credit a portion of the fee to the customer if the outcome is a losing outcome.

38. Processor-executable process steps according to claim 37, wherein the portion of the fee credited is equal to the fee.

39. Processor-executable process steps according to claim 38, wherein the credited portion is applicable only to a sale price of the product.

40. Processor-executable process steps according to claim 37, wherein the step of receiving a selection comprises:
   a receiving step to receive a commitment from the customer to purchase the product.

41. Processor-executable process steps according to claim 37, wherein the game reflects a probability that a winning outcome will result.

42. Processor-executable process steps according to claim 41, wherein the probability is based on a customer profile.

43. Processor-executable process steps according to claim 41, wherein the probability is a first probability if the selection was received from a first customer and is a second probability if the selection was received from a second customer.

44. Processor-executable process steps embodied in a computer-readable medium, the process steps comprising:
a receiving step to receive from a customer a selection of a plurality of products which are brought to a POS terminal by the customer;
a receiving step to receive a fee to play a game;
a determining step to determine an outcome of the game;
a providing step to provide one of the plurality of products to the customer if the outcome is a winning outcome; and
a crediting step to credit a portion of the fee to a sale price of one of the plurality of products if the outcome is a losing outcome.

45. Processor-executable process steps according to claim 44, wherein a first portion of the fee is credited to a first sale price of a first one of the plurality of products or a second portion of the fee is credited to a second sale price of a second one of the plurality of products.

46. Processor-executable process steps according to claim 44, wherein the portion of the fee credited is equal to the fee.

47. Processor-executable process steps according to claim 46, wherein the credited portion is applicable only to a sale price of one of the plurality of products.

48. Processor-executable process steps according to claim 44, wherein the step of receiving a selection comprises:
a receiving step to receive a commitment from the customer to purchase one of the plurality of products.

49. Processor-executable process steps according to claim 44, wherein the game reflects a probability that a winning outcome will result.

50. Processor-executable process steps according to claim 49, wherein the probability is based on a customer profile.

51. Processor-executable process steps according to claim 49, wherein the probability is a first probability if the selection was received from a first customer and is a second probability if the selection was received from a second customer.

52. Processor-executable process steps according to claim 44, wherein each of the plurality of products is associated with a respective winning outcome.

53. Processor-executable process steps according to claim 52, wherein the product provided is associated with the winning outcome.

54. Processor-executable process steps embodied in a computer-readable medium, the process steps comprising:
an identifying step to identify a desired product, the desired product being from a plurality of products that are brought to a POS terminal by the customer;
a determining step to determine whether a game outcome and a fee are associated with the product;
a providing step to provide the product to a customer if the game outcome is a winning outcome;
a determining step to determine a sale price based on the fee; and
a charging step to charge the customer the sale price for the product if the game outcome is a losing outcome.

55. Processor-executable process steps embodied in a computer-readable medium, the process steps comprising:
an identifying step to identify a desired product, the desired product being from a plurality of products that are brought to a POS terminal by the customer;
a determining step to determine whether a game outcome is associated with the product;
a providing step to provide the product to a customer if the game outcome is a winning outcome;
a determining step to determine a sale price; and
a charging step to charge the customer the sale price for the product if the game outcome is a losing outcome.

56. A device comprising:
a memory storing processor-executable process steps; and
a processor,
wherein the processor is operative with the process steps to:
i) receive a selection of a product from a customer, the product being selected from a plurality of products that are brought to a POS terminal by the customer;
ii) receive a fee to play a game;
iii) determine an outcome of the game;
iv) provide the product to the customer if the outcome is a winning outcome; and
v) credit a portion of the fee to the customer if the outcome is a losing outcome.

57. A device according to claim 56, wherein the portion of the fee credited is equal to the fee.

58. A device according to claim 57, wherein the credited portion is applicable only to a sale price of the product.

59. A device according to claim 56, wherein, in the step of receiving a selection, the processor is further operative with the process steps to receive a commitment from the customer to purchase the product.

60. A device according to claim 56, wherein the game reflects a probability that a winning outcome will result.

61. A device according to claim 60, wherein the probability is based on a customer profile.

62. A device according to claim 60, wherein the probability is a first probability if the selection was received from a first customer and is a second probability if the selection was received from a second customer.

63. A device comprising:
a memory storing processor-executable process steps; and
a processor,
wherein the processor is operative with the process steps to:
i) receive from a customer a selection of a plurality of products which are brought to a POS terminal by the customer;
ii) receive a fee to play a game;
iii) determine an outcome of the game;
iv) provide one of the plurality of products to the customer if the outcome is a winning outcome; and
v) credit a portion of the fee to a sale price of one of the plurality of products if the outcome is a losing outcome.

64. A device according to claim 63, wherein a first portion of the fee is credited to a first sale price of a first one of the plurality of products or a second portion of the fee is credited to a second sale price of a second one of the plurality of products.

65. A device according to claim 63, wherein the portion of the fee credited is equal to the fee.

66. A device according to claim 65, wherein the credited portion is applicable only to a sale price of one of the plurality of products.

67. A device according to claim 63, wherein, in the step of receiving a selection, the processor is further operative with the process steps to receive a commitment from the customer to purchase one of the plurality of products.

68. A device according to claim 63, wherein the game reflects a probability that a winning outcome will result.

69. A device according to claim 68, wherein the probability is based on a customer profile.

70. A device according to claim 68, wherein the probability is a first probability if the selection was received from a first customer and is a second probability if the selection was received from a second customer.

71. A device according to claim 63, wherein each of the plurality of products is associated with a respective winning outcome.

72. A device according to claim 71, wherein the product provided is associated with the winning outcome.

73. A device comprising:

a memory storing processor-executable process steps; and a processor, wherein the processor is operative with the process steps to:
  i) identify a desired product, the desired product being from a plurality of products that are brought to a POS terminal by the customer;
  ii) determine whether a game outcome and a fee are associated with the product;
  iii) provide the product to a customer if the game outcome is a winning outcome; and
  iv) determine a sale price based on the fee and charging the customer the sale price for the product if the game outcome is a losing outcome.

74. A device comprising:

a memory storing processor-executable process steps; and a processor, wherein the processor is operative with the process steps to:
  i) identify a desired product, the desired product being from a plurality of products that are brought to a POS terminal by the customer;
  ii) determine whether a game outcome is associated with the product;
  iii) provide the product to a customer if the game outcome is a winning outcome;
  iv) determine a sale price; and
  v) charge the customer the sale price for the product if the game outcome is a losing outcome.

75. An apparatus comprising:

means for obtaining a selection of a product from a customer, the product being selected from a plurality of products that are brought to a POS terminal by the customer;

means for obtaining a fee to play a game;

means for deciding an outcome of the game;

means for transmitting the product to the customer if the outcome is a winning outcome; and means for providing the fee to the customer if the outcome is a losing outcome.

76. An apparatus according to claim 75, wherein the provided portion of the fee is equal to the fee.

77. An apparatus according to claim 76, wherein the provided portion is applicable only to a sale price of the product.

78. An apparatus according to claim 75, wherein the means for obtaining a selection comprises:

means for obtaining a commitment from the customer to purchase the product.

79. An apparatus according to claim 75, wherein the game reflects a probability that a winning outcome will result.

80. An apparatus according to claim 79, wherein the probability is based on a customer profile.

81. An apparatus according to claim 79, wherein the probability is a first probability if the selection was obtained from a first customer and is a second probability if the selection was obtained from a second customer.

82. An apparatus comprising:

means for obtaining from a customer a selection of a plurality of products which are brought to a POS terminal by the customer;

means for obtaining a fee to play a game;

means for deciding an outcome of the game;

means for transmitting one of the plurality of products to the customer if the outcome is a winning outcome; and means for providing a portion of the fee to a sale price of one of the plurality of products if the outcome is a losing outcome.

83. An apparatus according to claim 82, wherein a first portion of the fee is credited to a first sale price of a first one of the plurality of products or a second portion of the fee is credited to a second sale price of a second one of the plurality of products.

84. An apparatus according to claim 82, wherein the provided portion of the fee is equal to the fee.

85. An apparatus according to claim 84, wherein the provided portion of the fee is applicable only to a sale price of one of the plurality of products.

86. An apparatus according to claim 82, wherein the means for obtaining a selection comprises:

means for obtaining a commitment from the customer to purchase one of the plurality of products.

87. An apparatus according to claim 82, wherein the game reflects a probability that a winning outcome will result.

88. An apparatus according to claim 87, wherein the probability is based on a customer profile.

89. An apparatus according to claim 87, wherein the probability is a first probability if the selection was obtained from a first customer and is a second probability if the selection was obtained from a second customer.

90. An apparatus according to claim 82, wherein each of the plurality of products is associated with a respective winning outcome.

91. An apparatus according to claim 90, wherein the product provided is associated with the winning outcome.

92. An apparatus comprising:

means for determining a desired product, the desired product being from a plurality of products that are brought to a POS terminal by the customer;

means for deciding whether a game outcome and a fee are associated with the product;

means for transmitting the product to a customer if the game outcome is a winning outcome;

means for deciding a sale price based on the fee; and means for billing the customer the sale price for the product if the game outcome is a losing outcome.

93. An apparatus comprising:

means for determining a desired product, the desired product being from a plurality of products that are brought to a POS terminal by the customer;

means for deciding whether a game outcome is associated with the product;

means for transmitting the product to a customer if the game outcome is a winning outcome;

means for deciding a sale price; and means for billing the customer the sale price for the product if the game outcome is a losing outcome.

94. A system for providing game play for products, comprising:

a customer device comprising:
- a customer memory storing processor-executable process steps; and
- a customer processor,
- wherein the customer processor is operative with the processor-executable process steps to:
    i) select a product from a plurality of products, the product being selected from a plurality of products that are brought to a POS terminal by the customer;
    ii) transmit a fee to play a game;
    iii) present an indication that the customer has won the product if the outcome is a winning outcome; and
    iv) receive credit for a portion of the fee if the outcome is a losing outcome; and a retailer device comprising:
- a retailer memory storing retailer processor-executable process steps; and
- a retailer processor,
- wherein the retailer processor is operative with the retailer processor-executable process steps to:
    i) receive a selection of the product;
    ii) receive the fee;
    iii) determine the outcome;
    iv) transmit the indication that the customer has won the product if the outcome is a winning outcome; and
    v) transmit the credit for the portion of the fee if the outcome is a losing outcome.

\* \* \* \* \*